(12) United States Patent
Blevins et al.

(10) Patent No.: US 7,647,126 B2
(45) Date of Patent: Jan. 12, 2010

(54) INTEGRATION OF PROCESS MODULES AND EXPERT SYSTEMS IN PROCESS PLANTS

(75) Inventors: Terrence L. Blevins, Round Rock, TX (US); J. Dashene Aren Samson, Quezon (PH); Mark J. Nixon, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 76 days.

(21) Appl. No.: 10/590,573

(22) PCT Filed: May 4, 2005

(86) PCT No.: PCT/US2005/015556

§ 371 (c)(1),
(2), (4) Date: Aug. 22, 2006

(87) PCT Pub. No.: WO2005/109127

PCT Pub. Date: Nov. 17, 2005

(65) Prior Publication Data

US 2007/0174225 A1 Jul. 26, 2007

Related U.S. Application Data

(60) Provisional application No. 60/567,980, filed on May 4, 2004.

(51) Int. Cl.
G05B 13/02 (2006.01)
G05B 11/01 (2006.01)
G05B 9/02 (2006.01)
G06F 17/00 (2006.01)

(52) U.S. Cl. ............................ 700/49; 700/17; 700/80; 707/104.1; 706/47; 702/185; 715/965

(58) Field of Classification Search .................... 700/9, 700/17, 49, 79, 80, 108–110, 50, 51; 707/104.1; 706/47, 60; 702/182–185; 715/965; 703/6
See application file for complete search history.

(56) References Cited

U.S. PATENT DOCUMENTS 4,985,857 A * 1/1991 Bajpai et al. ................ 702/184

(Continued)

FOREIGN PATENT DOCUMENTS

EP 0813129 12/1997

(Continued)

OTHER PUBLICATIONS

Camo product datasheet, "The Unscrambler 9.6," www.camo.com.
Developers.sun.com, "Core J2EE Patterns—Data Access Object," *Core J2EE Pattern Catalog* (2004), Retrieved from the Internet on Feb. 1, 2006: <URL: HttC4p://web.archive.org/web/20040414043406/java.sun.com/blueprints/corej2eepatterns/Patterns/C5DataAccessObjects.html>.

*Primary Examiner*—Sean P Shechtman
(74) *Attorney, Agent, or Firm*—Marshall, Gerstein & Borun LLP

(57) ABSTRACT

A process control system element for use in a process plant includes a process module, which represents a logical unit in the process plant, integrated with an expert module capable of detecting and/or mitigating abnormal situations associated with the logical unit. The process module may include a plurality of process objects, each process object representing a corresponding physical entity in the process plant. At least some of the process objects may include simulation capabilities to simulate the corresponding physical entities. The expert module may be adapted to detect at least one abnormal situation associated with the logical unit, and may be communicatively coupled to the process module to receive data from the process module during operation of the process module. Because the expert module is integrated with the process module, a user can more easily configure the expert module to detect and/or mitigate abnormal situations associated with the logical unit.

20 Claims, 15 Drawing Sheets

U.S. PATENT DOCUMENTS

| | | | |
|---|---|---|---|
| 5,168,441 A | 12/1992 | Onarheim et al. | |
| 5,408,412 A * | 4/1995 | Hogg et al. | 701/33 |
| 5,611,059 A | 3/1997 | Benton et al. | |
| 5,631,825 A | 5/1997 | van Weele et al. | |
| 5,680,409 A | 10/1997 | Qin et al. | |
| 5,706,455 A | 1/1998 | Benton et al. | |
| 5,841,654 A | 11/1998 | Verissimo et al. | |
| 5,926,177 A | 7/1999 | Hatanaka et al. | |
| 6,173,208 B1 | 1/2001 | Park et al. | |
| 6,362,839 B1 | 3/2002 | Hamilton et al. | |
| 6,385,496 B1 | 5/2002 | Irwin et al. | |
| 6,396,516 B1 | 5/2002 | Beatty | |
| 6,445,963 B1 | 9/2002 | Blevins et al. | |
| 6,571,133 B1 | 5/2003 | Mandl et al. | |
| 6,587,108 B1 | 7/2003 | Guerlain et al. | |
| 6,618,630 B1 | 9/2003 | Jundt et al. | |
| 6,633,782 B1 | 10/2003 | Schleiss et al. | |
| 6,691,280 B1 | 2/2004 | Dove et al. | |
| 2002/0019672 A1 | 2/2002 | Paunonen | |
| 2002/0022894 A1 | 2/2002 | Eryurek et al. | |
| 2002/0022895 A1 | 2/2002 | Genise et al. | |
| 2002/0055790 A1 | 5/2002 | Havekost | |
| 2002/0077711 A1 | 6/2002 | Nixon et al. | |
| 2002/0193888 A1 | 12/2002 | Wewalaarachchi et al. | |
| 2003/0014500 A1 | 1/2003 | Schleiss et al. | |
| 2003/0028269 A1 | 2/2003 | Spriggs et al. | |
| 2003/0153988 A1 | 8/2003 | Shepard et al. | |
| 2003/0191803 A1 | 10/2003 | Chinnici et al. | |
| 2003/0236576 A1 | 12/2003 | Resnick et al. | |
| 2004/0075689 A1 | 4/2004 | Schleiss et al. | |
| 2004/0153804 A1 | 8/2004 | Blevins et al. | |
| 2004/0199925 A1 | 10/2004 | Nixon et al. | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |

FOREIGN PATENT DOCUMENTS

| | | |
|---|---|---|
| EP | 1122652 | 8/2001 |
| GB | 2349958 | 11/2000 |
| GB | 2372365 | 8/2002 |
| WO | WO 95/04314 | 2/1995 |
| WO | WO 02/071169 | 9/2002 |
| WO | WO 03/075206 | 9/2003 |
| WO | WO 2005/107409 | 11/2005 |
| WO | WO 2005/107410 | 11/2005 |
| WO | WO 2005/107416 | 11/2005 |
| WO | WO 2005/109122 | 11/2005 |
| WO | WO 2005/109123 | 11/2005 |
| WO | WO 2005/109124 | 11/2005 |
| WO | WO 2005/109125 | 11/2005 |
| WO | WO 2005/109126 | 11/2005 |
| WO | WO 2005/109128 | 11/2005 |
| WO | WO 2005/109129 | 11/2005 |
| WO | WO 2005/109130 | 11/2005 |
| WO | WO 2005/109131 | 11/2005 |
| WO | WO 2005/109250 | 11/2005 |

OTHER PUBLICATIONS

Han et Ac6I., "Web Based rSPC (realtime Statistical Process Control) System Supporting XML Protoccol," *ISIE*, vol. 1, pp. 399-403 (2001).

Mehta et al., "Feedfoward Neural Networks for Process Identification and Prediction," Neural Network and Experty Systems Presentation (2001).

Mohr et al., "BizTalk and Application Integration—Translating Between Message Specification: BizTalk Mapper," *Professional BizTalk*, pp. 1-3 (2001).

StatSoft product datasheet, "Statistica, Multivariate Statistical Process Control," www.statsoft.com.

Tzovla et al., "Abnormal Condition Management Using Expert Systems," Neural Network and Expert Systerns Presentation (2001).

Umetrics product datasheet, "SIMCA-P 11" and "SIMCA-P+11," www.umetrics.com.

W3C; "XSL Transformations (XSLT)," *W3C Recommendation*, pp. 3 (1999).

International Search Report for International Application No. PCT/US2005/015556, mailed Aug. 26, 2005.

International Preliminary Report on Patentability dated Nov. 7, 2006 In related international application No. PCT/US2005/015556.

Written Opinion dated Nov. 7, 2006 in related international application No. PCT/US2005/015556.

Examination Report under Section 18(3) for Application No. GB0620322.8, dated Aug. 21, 2007.

Office Action for Chinese Application No. 200580014530.0, dated Jun. 27, 2008 including English language translation.

* cited by examiner

INTEGRATION OF PROCESS MODULES AND EXPERT SYSTEMS IN PROCESS PLANTS

RELATED APPLICATIONS

This application is a regular filed application of and claims, for the purposes of priority, the benefit of U.S. Provisional Application Ser. No. 60/567,980, entitled "Graphical User Interface for Representing, Monitoring, and Interacting with Process Control Systems," which was filed on May 4, 2004 and which this application hereby expressly incorporates by reference herein in its entirety. This application is also related to U.S. patent application Ser. No. 10/625,481, entitled "Integration of Graphic Display Elements, Process Modules and Control Modules in Process Plants," which was filed on Jul. 21, 2003, and which published as U.S. Publication No. 2004/0153804 on Aug. 5, 2004, which, in turn, is a Continuation-in-Part of U.S. patent application Ser. No. 10/278,469, entitled "Smart Process Modules and Objects in Process Plants," which was filed on Oct. 22, 2002, and which published as U.S. Publication No. 2004/0075689 on Apr. 22, 2004, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, and which published as U.S. Publication No. 2004/0199925 on Oct. 7, 2004, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: "Associated Graphic Displays in a Process Environment" Ser. No. 10,589,712; "User Configurable Alarms and Alarm Trending for Process Control Systems" Ser. No. 10/574,570; "A Process Plant User Interface System Having Customized Process Graphic Display Layers in an Integrated Environment" Ser. No. 10/574,824; "Scripted Graphics in a Process Environment" Ser. No. 10/587,845; "Graphics Integration into a Process Configuration and Control Environment"; "Graphic Element with Multiple Visualizations in a Process Environment" Ser. No. 10/590,574; "System for Configuring Graphic Display Elements and Process Modules in Process Plants Ser. No. 10/575,022; "Graphic Display Configuration Framework for Unified Process Control System Interface" Ser. No. 10/575,173; "Markup Language-Based, Dynamic Process Graphics in a Process Plant User Interface" Ser. No. 10/590,550; "Methods and Apparatus for Modifying Process Control Data" PCT/US05/15596 and Ser. No. 11/556,612; "Methods and Apparatus for Accessing Process Control Data" PCT/US05/15585 and Ser. No. 11/556,445; "Integrated Graphical Runtime Interface for Process Control Systems" PCT/US05/15439 and Ser. No. 11/556,347; "Service-Oriented Architecture for Process Control Systems" PCT/US05/15394 and Ser. No. 11/556,554.

TECHNICAL FIELD

The present invention relates generally to process plants and, more particularly, to an intelligent control and simulation environment that enables user viewing, simulation and control to be integrated at the system level of the process plant control architecture.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol, which perform functions within the control scheme based on inputs thereto and which provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide preconfigured displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally preconfigured to display, in known manners, information or data received from the process control modules or the devices within the process plant. In some known systems, displays are created through the use of objects that have a graphic associated with a physical or logical element and that is communicatively tied to the physical or logical element to receive data about the physical or logical element. The object may change the graphic on the display screen based on the received data to illustrate, for example, that a tank is half full, to illustrate the flow measured by a flow sensor, etc. While the information needed for the displays is sent from the devices or configuration database within the process plant, that information is used only to provide a display to the user containing that information. As a result, all information and programming that is used to generate alarms, detect problems within the plant, etc. must be generated by and configured within the different devices associated with the plant, such as controllers and field devices during configuration of the process plant control system. Only then is this information sent to the operator display for display during process operation.

While error detection and other programming is useful for detecting conditions, errors, alarms, etc. associated with control loops running on the different controllers and problems within the individual devices, it is difficult to program the process control system to recognize system-level conditions or errors that must be detected by analyzing data from different, possible diversely located devices within the process plant. Still further, operator displays have typically not been used to indicate or present such system-level condition information to operators or maintenance personnel and, in any event, it is difficult to animate objects within operator displays with these alternate sources of information or data for the different elements within the display. This fact is particularly true with respect to the animation and modeling of streams of material, such as the flow of fluid in pipes, the movement of raw materials on conveyor belts, etc. which are typically indicated by a simple line connected between two devices on the display. Moreover, there is currently no organized manner of detecting certain conditions within a plant, such as flow conditions and mass balances, as materials move through a plant, much less an easily implementable system for performing these functions on a system-level basis.

Likewise, it can be difficult to set up or create a simulation of the process plant or a portion of the process plant as simulation activities must typically be performed separately from the display and control activities performed in the on-line environment of the process plant. Still further, if a simulation of the plant is created, it is difficult, if not impossible, to integrate this simulation with the operator displays or with the control modules being implemented within the plant.

Expert systems may be used in process plants to help detect problems and/or correct problems in the process plant. For example, U.S. Pat. No. 6,633,782 describes a diagnostic system for use in a process control system that collects and stores data pertaining to the operation of the process control system in a database, and uses an expert engine to apply rules for analysis to the information in the database to determine solutions to problems in the process control system. The database may store various types of information that are relevant to determining a source of a problem detected in the process control system and/or steps to either further analyze or correct the detected problems. For example, information in the database may include data pertaining specifically to the detected problem and to a field device, a function block or a control loop in which the detected problem exists. The database may also store event and alarm data, such as notices of scheduled maintenance and changes to operating parameters, that may be relevant to identifying the source of the problem and/or to identifying the appropriate analytical and remedial measures. When a problem is detected, the expert engine may apply the rules for analysis to the relevant data in the database, information received from a diagnostic tool, an event journal, or an historian.

It can be difficult to set up or create an expert system to analyze the process plant or a portion of the process plant as the expert system typically must be set up and configured separately from the display and control activities performed in the on-line environment of the process plant. Still further, if an expert system is set up and configured to monitor a portion of the process plant, it is difficult, if not impossible, to integrate this expert system with the operator displays implemented within the plant.

SUMMARY

The present application discloses a process control system element for use in a process plant that includes a process module, which represents a logical unit in the process plant, integrated with an expert module capable of detecting and/or mitigating abnormal situations associated with the logical unit. The process module may include a plurality of process objects, each process object representing a corresponding physical entity in the process plant. At least some of the process objects may include simulation capabilities to simulate the corresponding physical entities and/or properties that cannot be directly measured such as operating efficiency, heat transfer, etc., for example. The expert module may be adapted to detect at least one abnormal situation associated with the logical unit, and may be communicatively coupled to the process module to receive process data and/or simulation data from the process module during operation of the process module. Because the expert module is integrated with the process module, a user can more easily configure the expert module to detect and/or mitigate abnormal situations associated with the logical unit.

DESCRIPTION OF THE PREFERRED EMBODIMENTS

Figure 1:
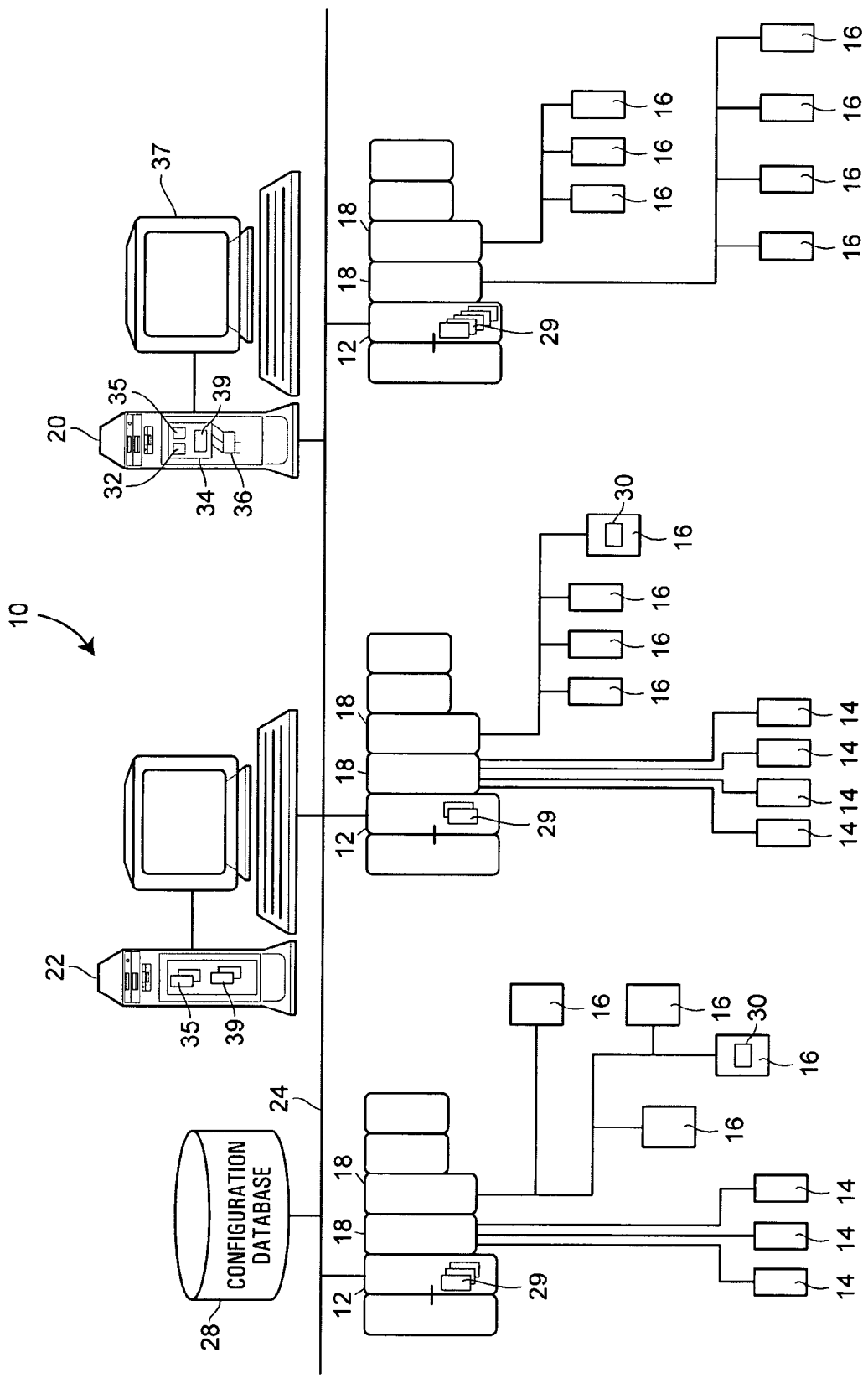
FIG. 1 is a block diagram of a distributed process control network located within a process plant including an operator workstation that implements a display routine which uses smart process objects to create process modules and graphic displays to simulate the operation of the process plant.

Referring now to FIG. 1, an example process plant 10 in which smart process objects used to form process graphic displays and process modules, both of which may be integrated with control modules to provide enhanced control and simulation within the plant environment, is illustrated in detail. In particular, the process plant 10 uses a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20 and 22 via a data highway 24 which may be, for example, an Ethernet link. A database 28 may be connected to the data highway 24 and operates as a data historian that collects and stores parameter, status and other data associated with the controllers and field devices within the plant 10 and/or as a configuration database that stores the current configuration of the process control system within the plant 10 as downloaded to and stored within the controllers 12 and field devices 14 and 16. While the controllers 12, I/O cards 18 and field devices 14 and 16 are typically located down within and distributed throughout the sometimes harsh plant environment, the operator workstations 20 and 22 and the database 28 are usually located in control rooms or other less harsh environments easily assessable by controller or maintenance personnel.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID), fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of device. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstation 20 includes a suite of operator interface applications and other data structures 32 which can be accessed by any authorized user (sometimes referred to herein as a configuration engineer and sometimes as an operator although other type of users may exist) to view and provide functionality with respect to devices, units, etc. connected within the process plant 10. The suite of operator interface applications 32 is stored in a memory 34 of the workstation 20 and each of the applications or entities within the suite of applications 32 is adapted to be executed on a processor 36 associated with the workstation 20. While the entire suite of applications 32 is illustrated as being stored in the workstation 20, some of these applications or other entities could be stored in and executed in other workstations or computer devices within or associated with the plant 10. Furthermore, the suite of applications can provide display outputs to a display screen 37 associated with the workstation 20 or any other desired display screen or display device, including hand-held devices laptops, other workstations, printers, etc. Likewise, the applications within the suite of applications 32 may be broken up and executed on two or more computers or machines and may be configured to operate in conjunction with one another.

Generally speaking, the suite of applications 32 provides for or enables the creation and use of three different types of entities, the operation of which may be integrated together to provide for enhanced control, simulation, and display functions within the process plant 10. More particularly, the suite of applications 32 may be used to create and implement process graphic displays 35 (which generally provide an operator display pertaining to a portion of the process plant), process modules 39 (which generally provide a simulation of a portion of a process plant) and process control modules, such as the control modules 29, which generally provide or perform on-line control of the process. The process control modules 29 are generally well known in the art and may include any type of control module, such as function block control modules, etc. The process graphic display elements 35, which will be described in more detail below, are generally elements that are used by an operator, engineer or other displays to provide information to a user, such as an operator, about the operation, configuration or set-up of the process plant and the elements therein. The process modules 39 are generally closely tied to the process graphic display elements 35 and may be used to perform simulations of the operation of the process plant or of some of the different elements therein connected in the manner depicted in the process graphic displays 35. The process graphic displays 35 and process modules 39 are illustrated as being stored in and executed by the workstations 20 and 22, although the process graphic displays 35 and the process modules 39 could be downloaded to and executed in any other computer associated with the process control plant 10, including laptops, handheld devices, etc.

Figure 2:
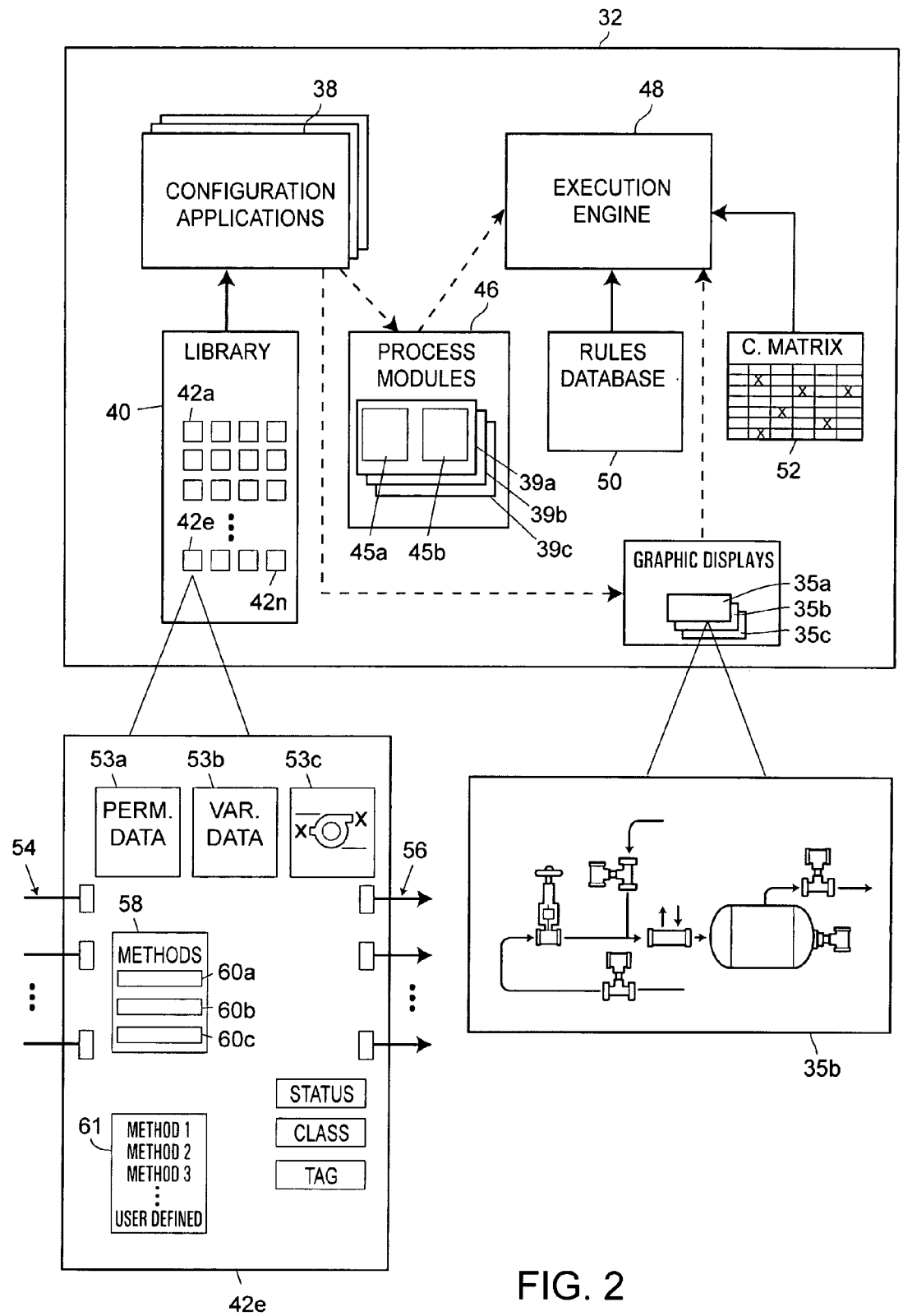
FIG. 2 is a logical block diagram of a set of applications and other entities, including smart process objects and process modules, stored in the operator workstation of FIG. 1, which may be used to implement enhanced functionality in a process plant.

FIG. 2 illustrates some of the applications and data structures or other entities within the suite of applications 32 of the workstation 20. In particular, the suite of applications 32 includes control module, process module, and graphic display configuration applications 38 which are used by a configuration engineer to create control modules, process modules (also called process flow modules) and the associated graphic displays. While the control module configuration application 38 may be any standard or known control module configuration application, the process module and graphic display configuration application may create process modules and graphic displays using one or more smart process objects, the nature of which will be described in more detail below. Still further, while the process module and process graphic configuration applications 38 are shown separately, one configuration application could create both of these types of elements.

A library 40 of smart process objects 42 includes example or template smart process objects 42 that may be accessed, copied and used by the configuration application 38 to create process modules 39 and graphic displays 35. As will be understood, the configuration application 38 may be used to create one or more process modules 39, each of which is made up of or created from one or more smart process objects 42 and may include one or more process flow or simulation algorithms 45, which are stored in a process module memory 46. Additionally, the configuration application 38 may be used to create one or more graphic displays 35, each of which is made up of or created from one or more smart process objects 42 and may include any number of display elements connected together. One of the graphic displays 35*b* is illustrated in FIG. 2 in expanded form and includes a depiction of a set of process elements, such as valves, tanks, sensors and flow transmitters, interconnected by connection elements which may be pipes, conduit, power cables, conveyors, etc.

An execution engine 48 operates or implements each of the graphic displays 35 and the process modules 39 during runtime to create one or more process displays for an operator as defined by the graphic displays 35 and to implement simulation functionality associated with the process modules 39. The execution engine 48 may use a rules database 50 defining the logic to be implemented on the process modules 39 as a whole and the smart process objects within those modules in particular. The execution engine 48 may also use a connection matrix 52 which defines the connections between the process elements within the plant 10 as well as within the process modules 39 to implement the functionality for the process modules 39.

FIG. 2 illustrates one of the smart process objects 42*e* in more detail. While the smart process object 42*e* is illustrated as being one of the template smart process objects, it will be understood that other smart process objects will generally include the same or similar elements, features, parameters, etc. as described with respect to the smart process object 42*e* and that the specifics or values of these elements, features and parameters may be changed or varied from smart process object to smart process object depending on the nature and use of that smart process object. Furthermore, while the smart process object 42*e* may be an object within an object oriented programming environment and thus include data stores, inputs and outputs and methods associated therewith, this smart process object may be created by and implemented within any other desired programming paradigm or protocol.

As will be understood, the smart process object 42*e* before being instantiated is an object that is associated with a particular type of entity, such as a physical or a logical entity, within the process plant 10 of FIG. 1. However, after being copied and instantiated, the smart process object 42*e* may be tied to a particular entity within the process plant. In any event, the smart process object 42*e* includes a data store 53 that is used to store data received from or pertaining to the logical entity with which the smart process object 42*e* is associated. The data store 53 generally includes a data store 53*a* that stores general or permanent information about the entity to which the smart process object 42*e* pertains, like manufacturer, revision, name, type, etc. A data store 53*b* may store variable or changing data, such as parameter data, status data, input and output data, cost or other data about the entity to which the smart process object 42e pertains including data associated with the entity as it has existed in the past or as it now exists within the process plant 10. Of course, the smart process object 42e may be configured or programmed to receive this data (e.g., cost data) on a periodic or non-periodic basis, from the entity itself via any desired communication link, from the historian 28 via the Ethernet bus 24 or in any other desired manner. A data store 53c may store a graphical representation of the entity to which the smart process object 42e pertains and which is used for actual display to the operator via an operator interface, such as the screen 37 associated with the workstation 20 of FIG. 1. Of course, the graphical representation may include place holders (marked by underlines within the data store 53c) for information about the entity, such as information defined by the parameter or other variable data about the entity as stored in the data store 53b. This parameter data may be displayed in the graphical place holders when the graphical representation is presented to the operator on a display device 37 as part of one of the graphic displays 35. The graphical representation (and the smart process object 42e) may also include predefined connection points (marked by an "X" in the data store 53c) that enable an operator or configuration engineer to attach upstream or downstream components to the process element, as depicted by the graphical representation. Of course, these connection points also enable the smart process object 42e to be aware of the elements connected to that smart object as configured within a process module and may specify a type of connection element that must be used, such as a pipe, a duct, etc., a stream associated with that element, etc.

The smart process object 42e may also include one or more inputs 54 and outputs 56 to enable communication with other smart process objects within or outside of a process module in which the smart process object 42 is used. The connections of the inputs 54 and outputs 56 to other smart process objects may be configured by a configuration engineer during configuration of a process module by simply connecting other smart process objects to these inputs and outputs or by specifying particular communications that are to take place between smart process objects. Some of these inputs and outputs may be defined as being connected to the smart process objects connected at the predefined connection points for the smart process object as discussed above. These inputs 54 and outputs 56 may also be determined or defined by a set of rules within the rule database 50 and the connection matrix 52 defining the connections between different devices or entities within the plant 10. The inputs 54 and the outputs 56, which include data stores or buffers associated therewith will, generally speaking, be used to provide communications of data from other smart process objects to the smart process object 42e or to provide communications of data stored within or generated by the smart process object 42e to other smart process objects. These inputs and outputs may also be used to provide communications between the smart process object 42e and other objects within the process control system, such as control modules within the controllers 12, field devices 14, 16, etc.

As illustrated in FIG. 2, the smart process object 42e also includes a method storage 58 that is used to store zero, one or more methods 60 (illustrated as methods 60a, 60b and 60c in FIG. 2) which may be algorithms to be implemented by the smart process object 42e during execution of a process module in which the smart process object 42e is used. Generally, the methods 60 stored in the method storage 58 will use the data stored within the data storage portions 53a and 53b and data obtained from other smart process objects or even data from other sources, such as the configuration database or historian 28, via the inputs 54 and the outputs 56 to determine information about the process plant 10 or an entity within the plant 10. For example, the methods 60 may determine poor or bad operating conditions associated with the entity defined by the smart process object 42e, errors associated with that or other entities within the process plant 10, etc. The methods 60 may be preconfigured or provided based on the type or class of smart process object and will generally be executed each time the smart process object 42e is executed within the execution engine 48 during runtime. Some example methods 60 that may be provided within a smart process object, such as the smart process object 42e, include detecting leaks, dead band, dead time, movement, variability, condition monitoring, computing costs, or other conditions associated with the entity.

The methods 60 may also be provided to help simulate the operation of the process entity associated with the smart process object on the material flowing through that process entity. Thus, the methods 60 may be provided to calculate mass balances, energy balances, flows, temperatures, compositions, vapor states, and other system-level or stream level parameters associated with the material in the plant 10, to simulate operation of the element so as to calculate expected outputs based on provided inputs, etc. Of course, these are but a few of the methods that can be stored in and run by a smart process object 42e, and there are many other methods that may be used, with such methods generally being determined by the type of entity being represented, the manner in which that entity is connected in and used in a process plant as well as other factors. It is important to note that, while the smart process object 42e may store and execute methods that detect system-level conditions, errors, etc., these methods may also be used to determine other information about devices, logical elements, such as process control modules and loops, and other non-system-level entities. If desired, the methods 60 may be programmed or provided in any desired programming language, such as C, C++, C#, etc. or may be referenced to or may define applicable rules within the rule database 50 that should be run for the smart process object 42e during execution.

If desired, each smart process object may include a library of applicable algorithms or methods which may be used to define the simulation behavior of the smart process object when connected within a process module. Such a library is illustrated in a pull down menu 61 for the smart process object 42e of FIG. 2 and a similar menu may be associated with each other smart process object. The configuration engineer may define the simulation behavior of a smart process object when this smart process object is placed in a process module 39 by selecting one of the library of simulation algorithms (called method 1, method 2, etc.) via, for example, the pull down menu 61. In this manner, the configuration engineer may define different simulation behaviors for a smart process object depending on the type or nature of the process for which the smart process object is being used to model.

If desired, the configuration engineer may instead provide a proprietary or other user supplied algorithm to define the simulation behavior of the process element defined by the smart process block. Such a user defined algorithm (illustrated as the "user defined" entry in the pull down menu 61) may be provided to and stored in a smart process object when that smart process object is placed within or used within a process module 39. This functionality enables the simulation behavior to be customized by the user to thereby provide for better or more accurate simulation. If desired, and as will be described in more detail later, the smart process objects 42 or each process module 39 may include an operator actuatable switch (such as an electronic switch or a flag) that disables the use of the simulation algorithms within the smart process objects and that, instead, causes the behavior of the process module to be determined by a high fidelity simulation package or program, such as one provided by HYSYS. In this case, the smart process object or the process module obtains simulated parameters from the high fidelity simulation, as opposed to using the simulation algorithms within the smart process objects themselves.

During execution of a graphic display 35 or a process module 39 by the execution engine 48, the engine 48 implements the communications defined by the inputs 54 and outputs 56 to each of the smart process objects in the graphic display 35 or process module 39 and may implement the methods 60 for each of those to perform the functionality provided by the methods 60. As noted above, the functionality of the methods 60 may be located in programming within the smart process object or defined by a set of rules within the rule database 50 that the engine 48 executes, based on the type, class, identification, tag name, etc. of a smart process object, to implement the functionality defined by those rules.

It will be noted that an instance of the smart process object 42e has a tag or unique name within the context of the process module with which the smart process object 42e is associated and this tag or unique name may be used to provide communications to and from the smart process object 42e and may be referenced by the execution engine 48 during runtime. Process module tags should be unique within the control system configuration. This tagging convention enables elements within the process modules 39 to be referenced by elements within others of the process graphic displays 35, process modules 39 and even the control modules 29. Still further, the parameters of the smart process object 42e can be simple parameters, such as simple values, structured parameters or smart parameters that know the expected units and attributes associated therewith. Smart parameters can be interpreted and used by the process rules engine or execution engine 48 to assure all signals are being sent in the same units or are converted properly. Smart rules can also be used to turn on and turn off groups of alarms for the smart process objects (or process modules) to create a smart alarm strategy and/or interface for the operator. Still further, smart process object classes can be associated with equipment and module classes within the process control strategy of the plant 10 to provide a known linkage between a smart process object and the process variables it will need to interpret or access.

Smart process objects, when used in process graphic displays or process modules, may also include mode of operation, status, and alarm behavior so that these smart objects may be put in different modes during runtime, such as the off, start-up, and normal modes, may provide a status associated with the object based on its current operating state, and may provide alarms based on detected conditions, such as a parameter out of range, limited, high variability, etc. Smart process objects may also have a class/subclass hierarchy which enables them to be categorized in class libraries, to be collected together in a composite structure, etc. Still further, smart process objects may utilize information from other elements, such as control modules and other objects to enable the smart process object to recognize when its associated entity is busy or, for example, acquired by a batch control process within the plant 10.

Smart process objects may be associated with any desired process entity, such as physical devices like pumps, tanks, valves, etc., or logical entities such as process areas, measurements or actuators, control strategies, etc. In some cases, smart process objects may be associated with connectors, such a piping, conduit, wiring, conveyors, or any other device or entity that moves material, electricity, gas, etc. from one point to another point within the process. Smart process objects that are associated with connectors, sometimes referred to herein as smart links or connector elements, are also tagged (even though the actual device or connector itself may not be tagged or able to communicate within the process plant 10), and are generally used to represent material flow between other elements in the process.

Smart links will typically include properties or parameters that define how different materials or phenomena (such as electricity) flow through the connection (e.g. steam, electricity, water, sewage, etc.) These parameters may indicate the type and nature of flow (such as the general speed, friction coefficients, type of flow like turbulent or non-turbulent, electromagnetic, etc.) through the connector and the possible direction or directions of flow through the connector. Smart links may include programming or methods that ensure that the units of the source and destination object to which the smart link connects match and, if not, may perform a conversion. The methods of the smart link may also model the flow through the connector using a model or an algorithm to estimate the speed or nature of the flow through the actual connectors, length and size of the physical connections, transport delay, etc. The stored parameters for the smart process object (such as friction parameters) may be used in these methods. Thus, in essence, the smart links or connector elements enable smart process objects to be aware of the other upstream and downstream objects or entities. Of course, smart links may, for example, define the connections between other objects, the type of fluid, such as liquid, gas, electricity, etc. within the system, the upstream and downstream side of the entities, which other entities are upstream and downstream of the entity for this smart process object, the direction of material, fluid, electric flow, etc. in any desired or convenient manner. In one embodiment, the matrix 52 may be created prior to execution of process flow modules and may define for the smart links the interconnections between the different devices within the plant and, therefore, the interconnections between the different smart process objects. In fact, the execution engine 48 may use the matrix 52 to ascertain the upstream and downstream entities and thereby define the communications between the smart process objects and the methods associated with the smart process objects. Still further, one or more sets of rules may be provided to be used by the smart process objects to interact with each other and to obtain data from each other as needed for the methods within the smart process objects and to resolve the impact of smart objects associated with output connections.

If desired, the smart process object 42e may also include hot links, such as URLs, to key documentation which may be applicable to the type of object, or which may be specific to the instance (depending on the criticality and application) of the device to which the smart process object 42e pertains. The documentation may be vendor supplied as well as user-specific. Some examples of documentation include configuration, start-up and shut-down procedures, operational and maintenance documentation. If desired, an operator may click on the object as displayed in an operator display to bring up the instance specific (if any) and generic documentation for the object or associated device. Also, the operator may be able to add/delete/change documentation independently of the system software such as maintenance requests, records of operational problems, etc. Furthermore, these hot links may be user configurable or changeable to provide the ability to add knowledge links to objects in the an operator interface, to provide for quick navigation to appropriate information associated with the object and to provide the ability to add work instructions specific to the customer, to the specific object type or even to the specific instance of the object.

While the process modules and process graphics are described above as being created together by the interconnection of different smart process objects, they may be created separately. For example, a process graphic may be created using smart process objects and, when completed, a process module for that graphic may be generated based on graphic elements and their interconnections in the graphic display. Alternatively, the process module may be first created using smart process objects and, once created, a graphic display for that process module may be automatically generated by the configuration application 38 using the graphic display elements in the smart process objects used to create the process module. Still further, a process module and a graphic display may be created separately and the individual elements within these two entities may be tied together manually by referencing one another (e.g., using the tag properties of the elements within the graphic display and the process module). Through this mechanism, a smart process object may be referenced by multiple displays. In any event, once created, a process graphic display and an associated process module may be run independently or separately, although they will typically communicate parameters and information back and forth as desired or needed.

In order to be more comprehensive, certain possible features and examples of smart process objects that may be used in or to create process graphic displays and process modules will be described in more detail below. Thereafter, a manner in which process graphic displays and process modules, created using the described elements and features, may be integrated with control modules to provide advanced control and simulation capabilities will be described. It will be understood, of course, that the smart process object elements and features are not limited to the elements and features discussed herein and that other features and elements could be used in or to create one or both of process graphic displays and process modules, if so desired.

Generally speaking, a set of predefined graphic elements may be provided in the configuration application to enable a user to construct operator or graphic displays that reflect the process plant. These graphic elements are designed to dynamically show on-line measurements and actuators that interface with the control system. In addition, unmeasured parameters that reflect process operation may be calculated using on-line process simulation provided in the process modules and may be shown as an integral part of the associated graphic displays.

Additionally, in an offline environment used for engineering or training simulation purposes, the process simulation provided by the process modules may be used in place of the process measurement values in the graphic elements and in the associated control modules. These values, which are calculated by the associated process modules, may be based on the actuator position or state as well as manual disturbance values illustrated in the process graphics. In this manner, the graphic displays and control modules may be used in both on-line or control situation and in off-line or simulation situations. Also, while the static portion of the graphic elements will, in many cases, appear similar to the three dimensional components included in known graphics libraries, further unique features or properties of these graphic elements, the information displayed with these elements, and their links to the control system I/O and process simulation modules is described below with respect to a number of possible types and examples of graphic elements.

Generally speaking the graphic elements and simulation algorithms in the process module associated with a smart process object fall into a one of a number of different types of process elements including stream elements, process connection elements, actuator elements, processing elements, measurement elements and estimated property elements. Stream elements generally define a stream of material in the process plant and may be exposed in the graphic display to show the composition, density, flow, temperature, pressure, weight, and/or any other parameters defining the stream of material. Stream elements may be defined at the input of the process module and provided to elements within the process module to thereby enable the flow of material through the process module to be modeled and depicted in the graphic display. Similarly, stream elements may be illustrated at the output or end of the process module to illustrate in the graphic display the material output of the portion of the process plant depicted by the graphic display. Stream elements also may be used to define how different graphic displays (and the associated process modules) are connected with one another. For example, the output stream in one process module may be the input stream in another process module and may supply the values used at the input stream of the other process module. Streams may contain the following four parts: name (e.g., pH stream), direction (e.g., flow input), measurement (e.g., flow, pressure, temperature), and composition (e.g., nitrogen, ammonia, etc.) However, streams could have other parts or parameters if so desired.

Process connection elements define the manner in which materials within the plant, such as solid materials, liquid and vapor, and gases are delivered or carried from one device to another. To clearly illustrate the material flow through the process, three different types of process connections including piping, ducts and conveyors may be used. Of course other connection elements, such as electrical cables to address power flow in electrochemical processes, etc. may be used as well. Piping is generally used to illustrate (and simulate) liquid and high pressure vapor or gas flow within the plant. Ducts are generally used to illustrate (and simulate) low pressure gas flow within the plant. Conveyors are generally used to illustrate (and simulate) the movement of solid material between processing units. As a result, each process connection element defines the type of connection, such as a pipe connection, a duct connection or a conveyor connection that is used to provide material at the input or output of a device.

If desired, the properties of the material that is being transferred by a connection are determined by the upstream input. This information plus a connection status variable defining if the connection is complete may be made available as properties of the connection element on the graphic display. A connection element may start at a processing element output, an actuator element output or a stream element output. In a similar manner, a connection element may terminate at a processing element input, an actuator element input or a stream input.

The properties of a connection element may be automatically displayed when the cursor is placed over the connection element in the graphic display. Also, the properties associated with a connection element may be exposed for permanent display by placing a measurement or estimated property element (defined below) on the connection element. If desired, a connection element may be created by holding the left mouse button down over an element output (such as a stream output, a processing element output or an actuator element output) and, while holding down a button on the mouse, positioning the cursor over an element input. For the connection to be established successfully, the input and the output types (pipe, duct, or conveyor) of the upstream and the downstream elements must match. The connection will automatically take on the type of the upstream element.

If desired, piping elements can be shown or depicted in the process graphic display as a pipe connection, duct elements (e.g., air or gas) can be shown as a duct and conveyor elements may be shown as conveyor belts. Piping, duct and conveyor element connections can be automatically routed between processing elements and arrows may be displayed outside the depiction of these elements to show the direction of the flow. If an upstream output is common to two connections, then a "T" element may be included in the pipe, duct or conveyor. Similarly, "T" elements may be used to combine multiple outputs. The color or other graphic property of a conveyor element may change to indicate its status, e.g., running/stopped, flowing/not flowing, plugged, etc. Generally speaking, the material flow along a conveyor is determined by the motor drive connected to the conveyor. Thus, a motor drive actuator (which is an actuator element described in more detail below) may be connected to the conveyor. Additionally, measurement elements (described below) can be connected to pipe, duct and conveyor elements to make it possible to expose measurements associated with the pipe, duct or conveyor elements, such as the speed of the conveyor or the flow of material in a pipe or duct, the properties of the material on or in the conveyor, pipe or duct, e.g. moisture or weight. Also, an exposed property element may be added to display properties of the material on or in the pipe, duct or conveyor that are not measured, for example, the composition of the material.

If desired, each of the piping, duct and conveyor connection elements may graphically and dynamically reflect a lost connection (e.g., by a color change), and that a selected property (pressure, temperature, length, etc.) is outside configured limits (e.g., by a color change). Furthermore, parameters calculated by the associated process module may be exposed in the graphic. For example, properties provided by the upstream connection, whether the connection status is bad or good, limits on one or more selected parameters of the connection element, etc. may be exposed in the graphic display to provide information to the operator about the connection element or the stream being transferred by the connection element.

Generally speaking, actuator elements are elements that perform some actuation function with respect to the stream and may be placed between different connection elements or between a processing element and a connection element. Examples of actuator elements include a regulating valve (with actuator), an on-off valve (with actuator), a pump (with motor), a force draft fan (with motor), an induced draft fan (with motor), an eductor (with on-off valve), a damper (with drive), a feeder (with variable speed motor) a conveyor motor drive (which may be attached to a conveyor element), etc.

The graphic depiction of the valve elements may dynamically reflect the implied valve position (by animation, for example), valve failure (by a color change, for example), the valve full open/closed position (by a color change, for example), and the AO, DO, DC, setpoint, PV, OUT, mode, etc. (by a numeric string or other indication, for example) of the associated control block controlling that valve. The simulation element associated with the valve elements (used in the process module) may have simulation algorithms that calculate parameters associated with the valve actuator, such as the discharge pressure, mass flow, liquid temperature, liquid composition, inlet pressure, and outlet pressure. These simulated or calculated parameters may be exposed in the process graphic, if so desired. However, the user or configuration engineer must usually configure the reference to an AO, DO or DC block in a control module associated with the valve as well as the valve type (e.g., linear, quick opening, equal percentage, valve sizing, etc.) and the stroke time from open to close. Of course, the simulation algorithms available to simulate the operation of the valve on the material flowing through the valve may be dependent upon the type of the valve and sizing information.

The graphic depiction of pump elements may dynamically reflect the motor status (using, for example, a color change), the associated DO or DC function block mode and setpoint (using, for example, strings), the motor speed (if variable speed drive is used), the AO setpoint, PV, OUT mode (if variable speed drive is used) and other desired parameters. Likewise, the process simulation (used in the process module) for this element may determine or calculate parameters such as the discharge pressure, liquid composition, liquid temperature, and mass flow, which parameters may be exposed in the graphic display. The user may need to define a pump curve based on the pump type. However, the user may configure the reference to the DO or DC block associated with the motor start/stop, the reference to the associated AO function block for variable speed drive (if used) and the pump curve (e.g., pressure versus flow) for the defining the operation of the pump.

The graphic depiction of a force draft or an induced fan actuator element may have a depiction that dynamically reflects the motor status, DO or DC function block mode and setpoint, motor speed (if variable speed drive is used), the AO setpoint, PV, OUT, DO or DC function block mode (if variable speed drive is used) and other desired parameters, any of which may be exposed in the graphic display. The process simulation element (used in a process module) for this element may determine or calculate parameters such as the discharge pressure, gas composition, gas temperature, and gas mass flow, which parameters may be exposed in the graphic display. The user may configure the reference to the associated DC block for motor start/stop, the reference to an AO block for variable speed drive (if used) and the fan curve (pressure versus flow) for defining the simulated operation of the fan.

In some cases a particular type of actuator may only be used with a specific type of connection, e.g., a pipe, a duct or a conveyor. The table below defines some example connection limitations for typical actuator elements.

|  | Pipe | Duct | Conveyor |
|---|---|---|---|
| Regulating valve | X | | |
| On-Off Valve | X | | |
| Pump | X | | |
| Eductor | X | | |
| Force Draft Fan | | X | |
| Induced Draft Fan | | X | |
| Damper Drive | | X | |
| Feeder | X | | X |
| Motor Drive | | | X |

Processing elements include plant equipment that processes the materials or streams in the plant in some manner. Generally speaking, all inputs and outputs to and from processing elements will be made through connection elements. Standard processing elements include tanks (vertical and horizontal), heaters, static mixers, reactors, mixers, air heaters and any other elements that perform some type of simple or standard processing activity. For standard processing elements, the user may specify the number of inputs and outputs to the element along with the physical equipment properties e.g. size, volume, etc. The simulation algorithm and static representation of these standard processing elements may be set so that they cannot be modified by the user but may be selectable as described above at configuration time. Of course, if desired, other, typically more complex plant equipment (such as distillation columns, evaporators, separators, boilers, etc.) may be implemented as custom processing elements. The static representation, number of inputs and outputs and the simulation algorithm of such custom processing elements may be modified to meet the user interface requirements. Once a custom processing element has been defined, it may be saved as a composite or template that may be reused or used as a starting point in the creation of other processing elements.

The tank standard processing element (either vertical or horizontal) may be configured based on the pipe connections to the tank and the tank element may dynamically reflect the level in the tank (using, e.g., dynamic animation), and the level at 100% or empty (using a color change, for example). The process module simulation for the tank may calculate and expose, via the graphic display, parameters such as the outlet temperature, the outlet composition, the liquid temperature and the simulated level of the tank. However, to tie the tank into the system, the user or configuration engineer may need to configure the number of input and output connections, the complete connections to the tank, the tank properties, such as size (e.g., diameter and height), etc.

The heater processing element may dynamically calculate and reflect, via the graphic display, the heat transfer coefficient (e.g., using a color change), the outlet product temperature, the inlet product temperature, the outlet pressure (assuming fixed drop), etc. A user or configuration engineer may need to configure the complete connections to the heater, the heater surface area and the heat transfer coefficient when clean.

Of course, other processing elements such as a static mixer, a reactor, a mixer, an air heater, a heat exchanger, etc. may have display and simulation capabilities that are tailored to these types of devices. Non-standard processing elements, such as distillation columns, evaporators, separators, boilers, etc. may be represented graphically using a custom processing element in which the simulation associated with the vessel may be user defined if not included in a standard selection. The processing in these elements may be described or defined as a step response model relating each input to each output of the vessel. Inputs may be gas and/or liquid streams. Optionally, the user may define the equations that describe the relationships between the inputs and outputs of the processing element and these equations may be stored in the process module using that element to perform simulation. If desired, some simple static graph representations may be provided to help the user quickly create the static graphics associated with a custom processing element. If these simple graphics are used, then the user may need to only specify the desired number of input and output connections and the type of connection supported (e.g., pipe, duct, or conveyor) supported by the custom processing element. In response, the graphic item will be displayed and can be immediately used in the creation of the operator graphic. If desired, the gains and any dynamics associated with each input and output of the process element may be specified if the user elects to specify the simulation algorithm as step responses. If the user selects a custom algorithm, then an expression editor may be provided for the user to define the simulation algorithm. Based on the method selected, the properties of the custom processing element outputs may be calculated differently. Furthermore, the user may reference one or more of the algorithms that they have defined in a separate software assembly.

Additionally, several pre-defined composites or templates may be provided for creating custom processing elements. These templates may include, for example, a boiler template having a custom algorithm that calculates the exit gas $O_2$, the exit gas CO, the steam generated, the boiler drum level and the boiler draft. Such a template may be based on a single fuel input. However, by modifying the template, it is possible to simulate boilers with multiple fuels. Other pre-defined templates may include a specialized vessel-cyclone separator template, which may be used with in conjunction with the spay dryer custom processing element, and which may include a step response model to model the operation of the separator. Likewise, a column template, a spray dryer, and an evaporator body may utilize a step response model to define the expected process response. In an evaporator, based on the energy input and the concentration of the input flow, the concentration of the outlet flow and vapor release can be calculated. Multiple evaporator elements may be connected together along with heat exchanger and eductor elements to create a multiple-effect evaporator. Similarly, a specialized vessel-stack custom template processing element may be used with the boiler processing element. In this case, the properties of the inlet may be carried through the stack with no modifications if so desired, or to reflect emissions reductions performed in the stack.

Other types of elements that can be used to create graphic displays and process modules include measurement elements and property elements. Measurement elements include transmitter elements, which may be used in the graphic display to access the measurement value associated with a physical transmitter, and switch elements. Generally, the transmitter element may dynamically reflect bad or uncertain status, the mode of the associated AI function block in the control module, the measurement value and units, etc. associated with an actual transmitter (sensor) or other data associated with the actual transmitter. In an off-line mode (or simulation mode) the transmitter element may be used to access and display the simulation value provided by the process module rather than the value associated with the AI or PCI block or may be used to provide a measurement value to the associated AI block in the control module as a measurement to be used in the simulated control routine. The transmitter element can be added to a connection element or to a processing element and, when such a transmitter element is added to the display, the user will generally need to identify the associated AI, PCI or DI block in controller scheme that is providing the measurement. In the on-line mode, the value of the measurement may be shown next to this measurement element. In the off-line mode (or simulation mode) the simulated value of the measurement (as developed by the corresponding process module) may be automatically displayed. In on-line operation, the user can elect to switch control and display to the simulated value in the event of a measurement failure.

A switch element may dynamically reflect a bad or uncertain status, the mode of the associated DI (e.g., manual or OS), and the discrete value of a switch (on, off, etc.) When in an off-line simulation mode, the user may use the switch display element to access and change the switch parameters in the graphic display and control module by selecting a simulation value or a manual value and status and by manually entering the value and status of the switch. However, a user must generally configure the switch element by providing a reference to an associated DI block in the control scheme, a reference to the element property that triggers the switch and the limit and deadband associated with a change of state of the switch.

An estimated property element generally exposed an estimated property of the system as determined by the process module and may be added to a connection or processing element to display any property of that element. When this element is placed on a connection element or on a piece of equipment, the user can browse and select the properties that will be displayed. Thus, simulated properties that are not available through a physical measurement may be exposed through the use of the estimated properties element. Such an estimated property element may dynamically reflect a good/bad connection, the estimated property value(s), and a property that is outside of an associated limit or change. A user must generally configure the reference to property(s) to be displayed and the limits and color changes for the element if the property is outside of the limits.

As will be understood, by attaching transmitter elements and estimated property elements to processing elements, actuator elements and connection elements, the properties associated with the inputs and outputs of these process elements may be referenced during on-line operation or off-line simulation. These properties may also be made visible in the graphic display.

Figure 3:
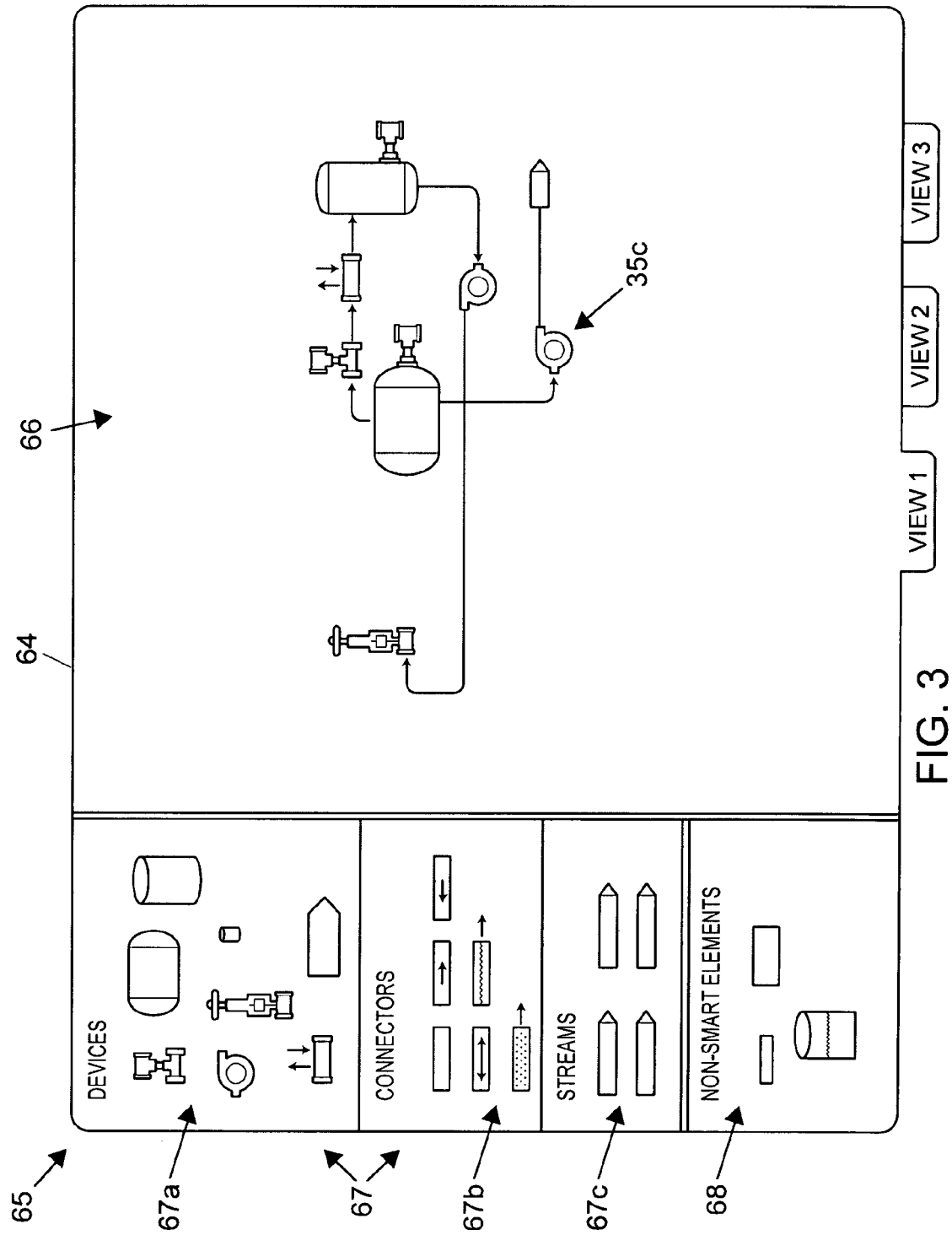
FIG. 3 is a simplified depiction of a configuration screen used by a configuration engineer to create a process graphic display or a process module using smart process objects stored in an object library.

Generally speaking, an operator may run or execute the configuration application 38 to create one or more process modules 39 or graphic displays for implementation during operation of the process 10 or for implementation in a simulation environment. In one embodiment, the configuration application 38 presents a configuration display, such as that illustrated in FIG. 3, to the configuration engineer. As seen in FIG. 3, a configuration display 64 includes a library or template section 65 and a configuration section 66. The template section 65 includes a depiction of sets of template smart process objects 67, which may include the smart process objects 42 of FIG. 2 and may be any of the connection, measurement, stream, processing, and estimated property elements described above. If desired, non-smart elements 68 that only have a graphic definition may, also be provided. Essentially, the templates 67 and 68 are generic objects that may be dragged and dropped onto the configuration section 66 to create an instance of a smart process object within a process module or graphic display (or both). A partially completed process graphic display 35c is illustrated as including a valve, two tanks, two pumps, a flow transmitter and two sensors interconnected by flow path connectors, which may be smart links or connector elements as described above and providing a stream output. It will be noted that the graphic display 35c may be made up of both smart process objects and non-smart elements.

When creating a graphic display, such as the graphic display 35c (or a process module), the configuration engineer may select and drag the smart process objects 67 and the elements 68 illustrated in the template section 65 onto the configuration section 66 and drop them there in any desired location. Generally, the configuration engineer will select and drag one or more smart device process objects 67a or non-smart elements 68 depicting devices onto the configuration section 66. The configuration engineer will then interconnect the smart device process objects within the configuration section 66 with smart connector process objects 67b and may place input and output streams 67c into the display. Moreover, non-smart elements may be added to the display. The configuration engineer may change the properties of each of the smart process objects during this process using pop-up properties menus, etc. and, in particular, may change the methods, parameters, tags, names, hot links, modes, classes, inputs and outputs, etc. associated with these smart process objects. When the process or configuration engineer has created a process module with each of the desired elements, typically representing a process configuration, area, etc., the configuration engineer may define rules or other functionality associated with the module. Such rules may be execution rules such as those associated with the performance of system-level methods, like mass balance and flow calculations. The process engineer or operator may also decide to add trends and faceplates that would be useful when the process display is on-line. After creating the graphic display 35c, the configuration engineer may save that display in a memory and may, at that time, or later, instantiate and download that display to the execution engine 48 in a manner that the execution engine 48 may provide a graphic display. Of course, the configuration engineer could create a process module in the same or similar manner although different graphics may be depicted for process module elements as opposed to process graphic display elements. Furthermore, the operator may elect to turn on levels of detail while they are running the plant. For example, one of the levels of detail would show the composition at each connection.

As noted above, the process graphic or process module may be provided with a specific tag. For example, smart process objects elements within a graphics display or a process module may be provided a tag including an alias that can be filled in or selected at runtime by, for example, the execution engine 48 based on other factors, such as a piece of equipment or a route selected within the process control system. The use of alias names and indirect referencing in process control systems is discussed in detail in U.S. Pat. No. 6,385,496, which is assigned to the assignee of the present invention and which is hereby expressly incorporated by reference herein. Any of these techniques may be used to provide and resolve aliases in tags for the smart process objects described herein. With the use of aliases and the like, the same process module may include or be used to support different views for sets of equipment, etc.

The display 64 of FIG. 3 illustrates tabs (View 1, View 2 and View 3) for different views of a process module or graphic display. These tabs may be used to access and create different views for different users associated with the process using some of the same smart process objects therein.

Generally speaking, when the configuration engineer creates a process module or a graphic display, the configuration application 38 automatically stores the smart process objects, along with the connections therebetween, in a database. This database can then be used to create other process modules and graphic displays which may, for example, provide different views using one or more of the same smart process objects. As such, when creating the second view, the configuration engineer can simply reference the smart process object, as already created and stored within the database, and any methods, etc. stored therewith to place that smart process object in the second view. In this manner, the database can be populated as the process control modules and graphic displays are created and the database can be used at any time to create and execute other views, modules, and graphic displays using smart process objects which already exist within the process flow database. Using such a database, each smart process object within the database may support or be used in process modules and referenced in multiple graphic displays. As will also be understood, the process modules may be constructed by building displays for these modules and then specifying flow algorithms to be used in or associated with process modules. Of course, individual process modules may be spread across and executed by different computers and process modules may be communicatively connected to one other to operate in conjunction with each other, either on the same or on different computers. When this is done, input and output streams will be externally referenced to tie process modules together.

As noted above, the configuration engineer may, as part of the process module or graphic display creation, attach or provide the simulation algorithm of the process module. These simulation algorithms may be preconfigured to calculate or determine certain process or system-level properties, such as mass balance calculations, flow calculations, efficiency calculations, economic calculations, etc. with respect to the process depicted or modeled by the process module. As a result, the process modules themselves may have mode, status, and alarm behavior, can be assigned to workstations, and may be downloaded as part of the display downloads. If desired, the simulation algorithms may be executed by the execution engine 48 to perform mass or heat balancing, flow routing, flow efficiency, flow optimization, economic calculations related to process simulation or other desired calculations using the data provided in the smart process objects of the process module. Still further, these simulation algorithms may access parameters from the control strategy, i.e., the control modules associated with and downloaded to the controllers, field devices, etc. and may, conversely, provide data or information to these control modules.

It will be understood that the execution engine 48 is needed to enable the process algorithms to execute across an amalgamation of all process objects and links configured on all displays. Thus, the simulation algorithms (within the process modules) will generally execute regardless of whether any associated graphic display is loaded, i.e., called up and displaying information to a user. Of course, the simulation algorithms may be cross-checked across the entire process 10 or across defined subsets of the process 10. It will also be understood that, during execution of any particular process module, the execution engine 48 may provide a display to an operator on an operator interface depicting the interconnected objects or entities within the process module based on the graphic display associated with that process module. The parameters, graphics, etc. of the display will be determined by the configuration and interconnection of the smart elements within the process module. Furthermore, alarms and other information to be provided on this or other displays may be defined and generated by the methods within the smart process objects and the simulation algorithms associated with a particular process module. If desired, the execution engine 48 may provide a display for a process module to more than one operator interface or may be configured or set to provide no display, even though the execution engine 48 continues to execute the process flow module and thereby perform the methods, alarm behavior, flow algorithms, etc. associated therewith.

If desired, a process module may be automatically generated from a graphics display (or vice versa) and the functionality available to the process module is determined by the process graphic elements. What should be clear is that the process module is preferably constructed to shadow the process graphic display. As a result, when the user configures a process graphic display, the user has the ability to include additional information for the process module such as mass or energy streams. These streams are used in the process module to establish starting conditions needed by the simulation function blocks.

Additionally, because process modules are actual software modules run in a computer, it is also possible for them to reference, and be referenced by controller modules to use the parameters, control strategies, displays, etc. associated with the controller modules. Also, using this capability, it is possible for a process module to be created independently of the process graphic display.

Generally speaking, process modules will be made of processing elements, streams, and their associated connections. Because there is a one-to-one correspondence between the process graphics elements and the simulation elements (in the process modules), it will be possible for a user to construct a graphic display and to automatically generate the corresponding process module from that display. Of course, if desired, the user may create the process module and then automatically create the graphic display from that module using the graphics within the smart process objects. However, to allow the automatic generation of a process module, it may be necessary for the user to identify the actuator, connection or processing element properties associated with the measurement elements and estimated property elements. A user may also need to create a process simulation before creating the process graphics or, in some cases, before the control modules are constructed. After the simulation is constructed, it will be possible to fill in the references to the I/O blocks in the control module. Also, when the associated graphic display is created, it will be possible to browse to the existing process module to set the property references.

In some cases the process graphic may not contain all the detail needed to construct the process simulation. Thus, it is desirable to provide an editor to enable the user to edit the simulation or process modules that have been automatically created from a process graphic. Also, because multiple process graphics may need to display the same piece of equipment, it may be necessary in the construction of a process graphic for an element to be able to reference an existing process module.

Generally speaking, the simulation that corresponds to the processing elements will have a common structure. If desired, the block input connections and the parameters of the simulation are stored in the process module so that no reference to a control module is needed. Furthermore, the number of input and output connections supported by the simulation may be defined as extensible, results from the simulation execution may be reflected in the simulation output connections or as parameters of the simulation and the simulation algorithm may be defined as a step response or may be entered by the user. When the simulation algorithm is entered by the user, the user may independently specify a dynamic for each output.

Still further, a common set of parameters may be supported for input and output connections. The parameters associated with input and output connections may be communicated between blocks as an array parameter or structure and may include parameters such as a connection status (e.g., good, bad, limited, etc.), a mass flow parameter, a pressure parameter, a temperature parameter, a specific heat parameter, a density parameter or any other desired parameter. In some cases, other parameters such as the composition of a stream may be provided and used in the simulation algorithm. To support this requirement, a standard and extended stream element may be provided. As part of the extended stream element configuration, the user may select a set of pre-defined groups of data to define the stream element. Such extended connections will only be allowed to connect to a block that utilizes this information. In general, the extended parameters may include a group name and a number of specific elements. For example, a fuel input stream to a boiler processing element may contain the components of the fuel including a fuel set, the amount of carbon, hydrogen, sulfur, oxygen, moisture and nitrogen in the fuel (all in weight % if desired). As another example, a turbogenerator processing element may use a steam stream and the connections to the associated simulation may use an extended parameter set that includes a steam set, steam enthalpy (actual) entering the stage, steam enthalpy (actual) exiting the stage, steam enthalpy (if isentropic expansion), etc.

The expanded group set may also be used when simulation elements within a process module are used as an interface to high fidelity simulation packages. In this case, the composition of some streams can be made visible in the process graphic. Also, if desired, an interactive editor may be provided to make it easier to create or modify the values displayed on a graphic display, as well as associated faceplates and detail displays for control modules to be presented on the graphic displays.

Figure 4:
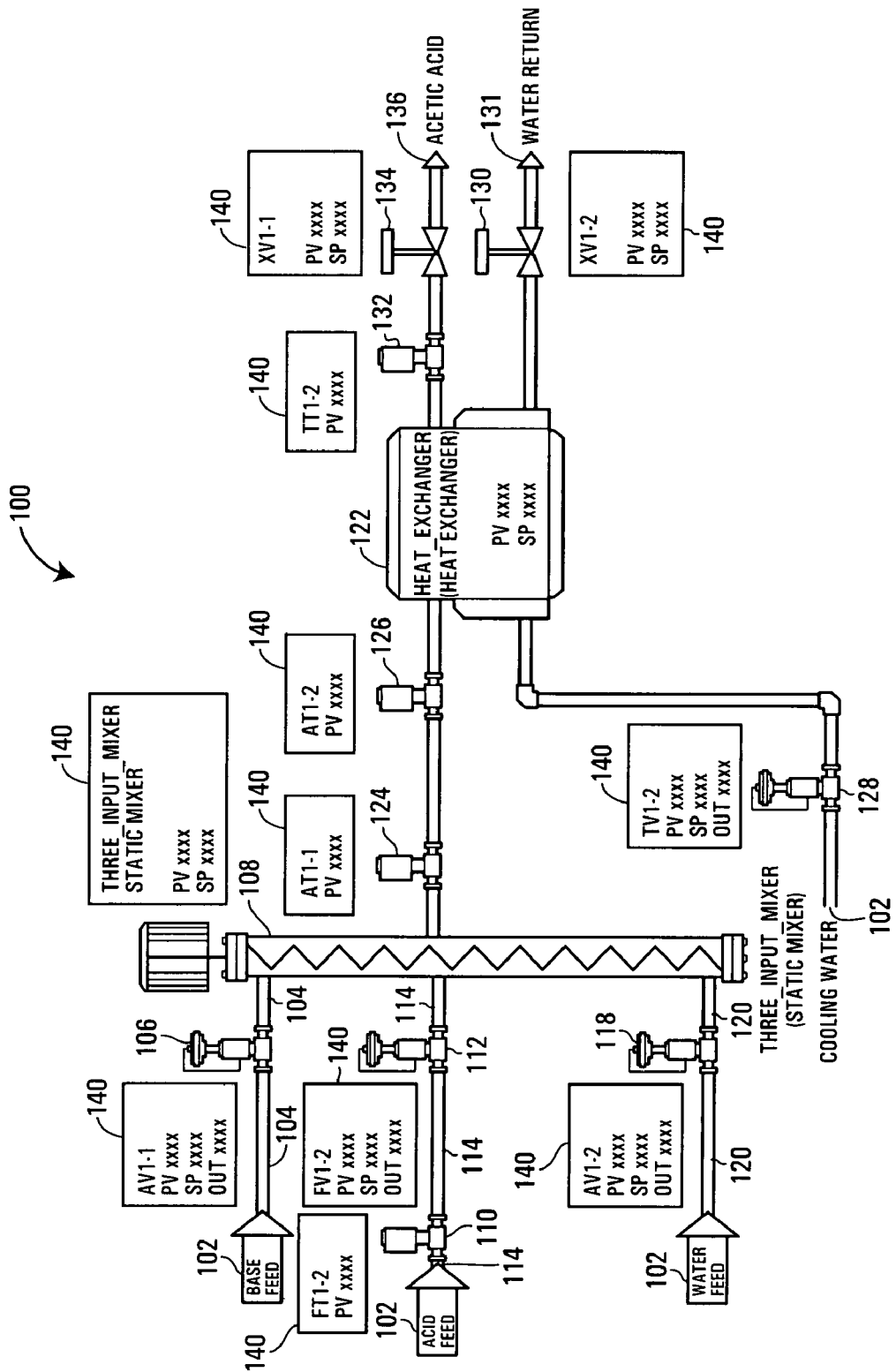
FIG. 4 is a detailed depiction of an example process graphic display including the depiction of streams and connection elements within the process plant, created by interconnecting the graphic display elements of a number of smart process objects.

FIG. 4 illustrates an example graphic display 100 that may be created using the elements and configuration applications described above. In particular, the graphic display 100 depicts a portion of process plant that produces white vinegar from water, acid and a base. As illustrated in FIG. 4, the process graphic display 100 includes four stream elements 102 at inputs thereto defining the streams of Base Feed, Acid Feed, Water Feed and cooling water. The Base Feed stream 102 is delivered through a piping connection element 104 to an actuator element in the form of a valve 106. The output of the valve 106 is connected to a first input of a mixer 108 via a piping connection element 104. In a similar manner, the Acid Feed 102 is connected to a transmitter element 110 and then to a further valve 112 which is connected to the mixer 108. The Acid Feed 102 and transmitter 110, the transmitter 110 and the valve 112 and the valve 112 and the mixer 108 are connected via piping connection elements 114.

As can be easily seen, an output of the mixer 108 is connected to a heat exchanger 122 via piping and two transmitters 124 and 126. The cooling water stream 102 is delivered to the heat exchanger 122 via a valve 128 and exits the heat exchanger via a valve 130 to produce a return water stream element 131. Likewise, the output of the heat exchanger 122 is delivered through a transmitter element 132 and a valve 134 to provide an output Acetic Acid stream element 136. While not always called out in particular, the elements in the graphic display are in all cases connected with one another via piping connection elements.

It will be understood that display boxes 140, which may be generated as properties of the display elements themselves or which may be separate elements in the form of transmitter and estimated property elements or elements that reference blocks in control modules, are illustrated in the graphic display 100 to indicate or expose parameters, such as process variable (PV) values, setpoint (SP) values, OUT values, etc. associated with the different elements. Additionally, if the user were to place a cursor over some of the elements, the display 100 may illustrate other values associated with the referenced elements. For example, placing the cursor over one of the stream elements (such as the Acetic Acid stream output 136), may cause the graphic to indicate the composition, pressure, temperature, density, flow rate, etc. of the acid stream at this point in the process. Of course, the values and parameters displayed on the graphic display 100 may be delivered from an actual referenced transmitter within the process control system (such as from an AI block in the control system), or from a process module simulation element that simulates the functionality of the element. The graphic display 100 of FIG. 4 may be provided to a user during operation of the process which makes white vinegar or to implement a simulation of that process to be used, for example, to perform design or operator training activities.

Figure 5:
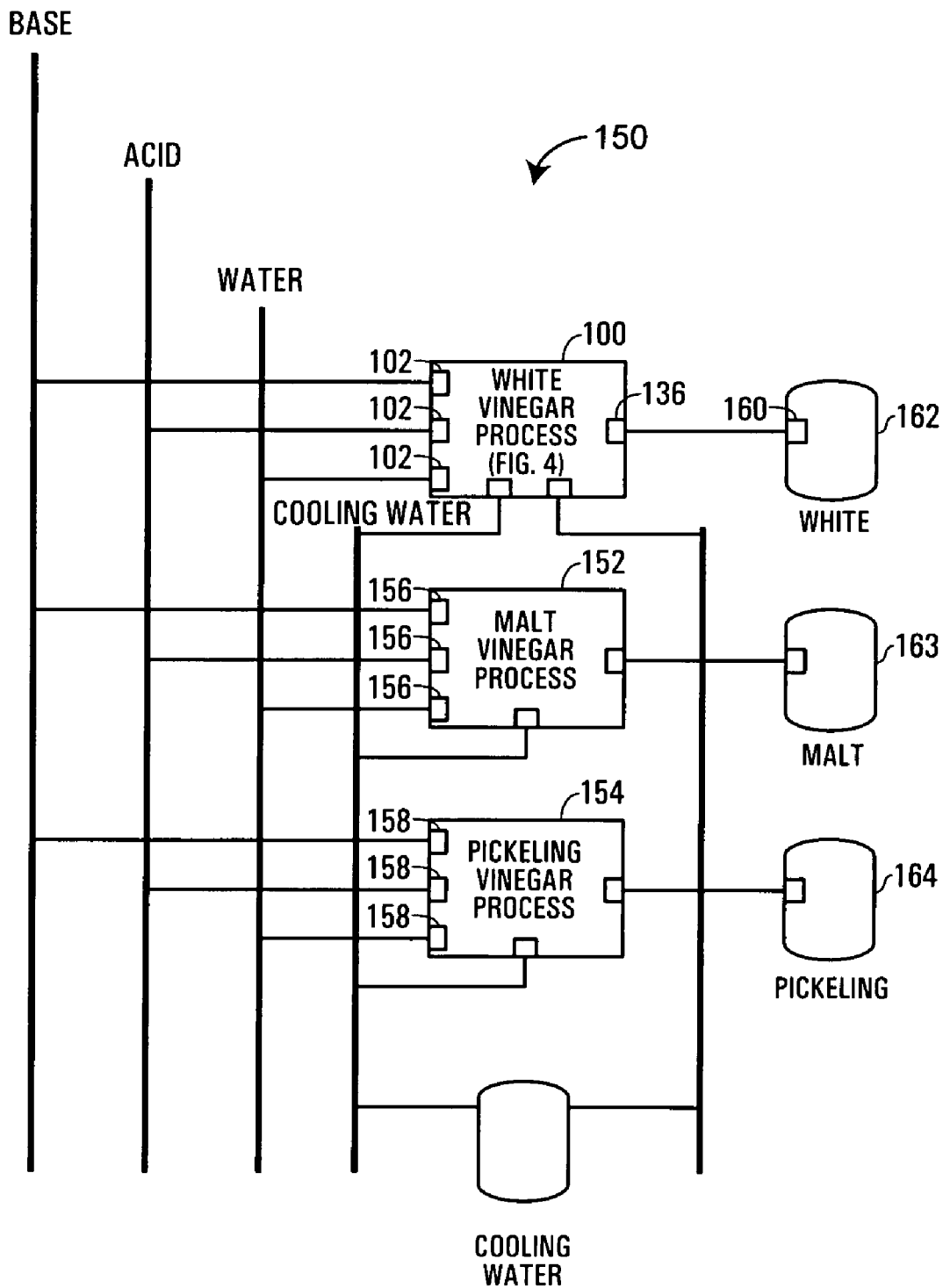
FIG. 5 is a depiction of a set of minimized process graphic displays, including the process graphic display of FIG. 4, interconnected into a larger graphic display for the plant.

FIG. 5 illustrates a manner in which different graphical displays (and similarly, in which different process modules) may be connected together to form higher level displays (or process modules) illustrating (or simulating) more of the process plant. In the display 150 of FIG. 5, the process graphic 100 is collapsed into a box that has a name or label and a set of stream inputs and outputs shown as connection points. If desired, the user may expand the process graphic 100 of FIG. 5 into that shown in FIG. 4 by selecting and, for example, double clicking on that graphic. Additionally, other collapsed graphic displays 152 and 154 are illustrated as being connected to the base feed, acid feed and water feed, as well as to the cooling water feed via input stream elements 156 and 158. The stream output 136 of the process graphic display 100 is connected to a stream input 160 of a holding tank 162 for white vinegar. In a similar manner, the stream outputs of the process graphic displays 152 and 154 are connected to stream inputs of holding tanks 163 and 164 for malt vinegar and picketing vinegar, respectively. As will be understood, the process graphics 152 and 154 are configured to provide graphics for portions of the process plant that make malt vinegar and picketing vinegar, respectively, and data and graphic views pertaining to these sections of the process plant may be viewed by expanding these displays.

FIG. 5 illustrates, however, that different graphical sections of the process plant may be connected together via connections between stream elements. In particular, the stream elements may be included in a display to define the starting properties associated with a connection element. Also, stream elements may be used as connection points between displays. For such off-sheet connections between displays, the user may click on the stream to immediately call up the associated display that contains the referenced connection. Thus, generally speaking, the mass/composition of the stream element will normally be used to define the starting properties of a process input, i.e., the starting feedstock composition, etc. or to define a link to a stream connection on another display. Connections may be made on the input or output of the mass/composition stream element. For stream elements, the user may generally configure the name of the stream (which should be unique within the system), the properties of the stream (if there is no reference input or input connection), the mass fraction of the different components of the stream (if the stream is made up of more than one component), the pressure or mass flow, the temperature, the specific heat, the density, the required connection type (pipe, duct, conveyor) and the referenced input stream (if used for accessing a stream on another display). Likewise, an energy stream element may be used to define the starting energy associated with a process input, e.g., the BTU/HR transfer, etc. or to define a link to the energy properties of a stream connection on another display.

While FIG. 5 illustrates the use of streams to interconnect different collapsed graphic displays, the same procedure could be used to interconnect (and to illustrate the interconnection of) different process modules. In particular, process modules could be collapsed to illustrate a name and stream element inputs and outputs and these collapsed process modules could be communicatively tied or connected to other process modules using depictions of communication connections or links between the stream outputs and the stream inputs of different process modules.

Figure 6:
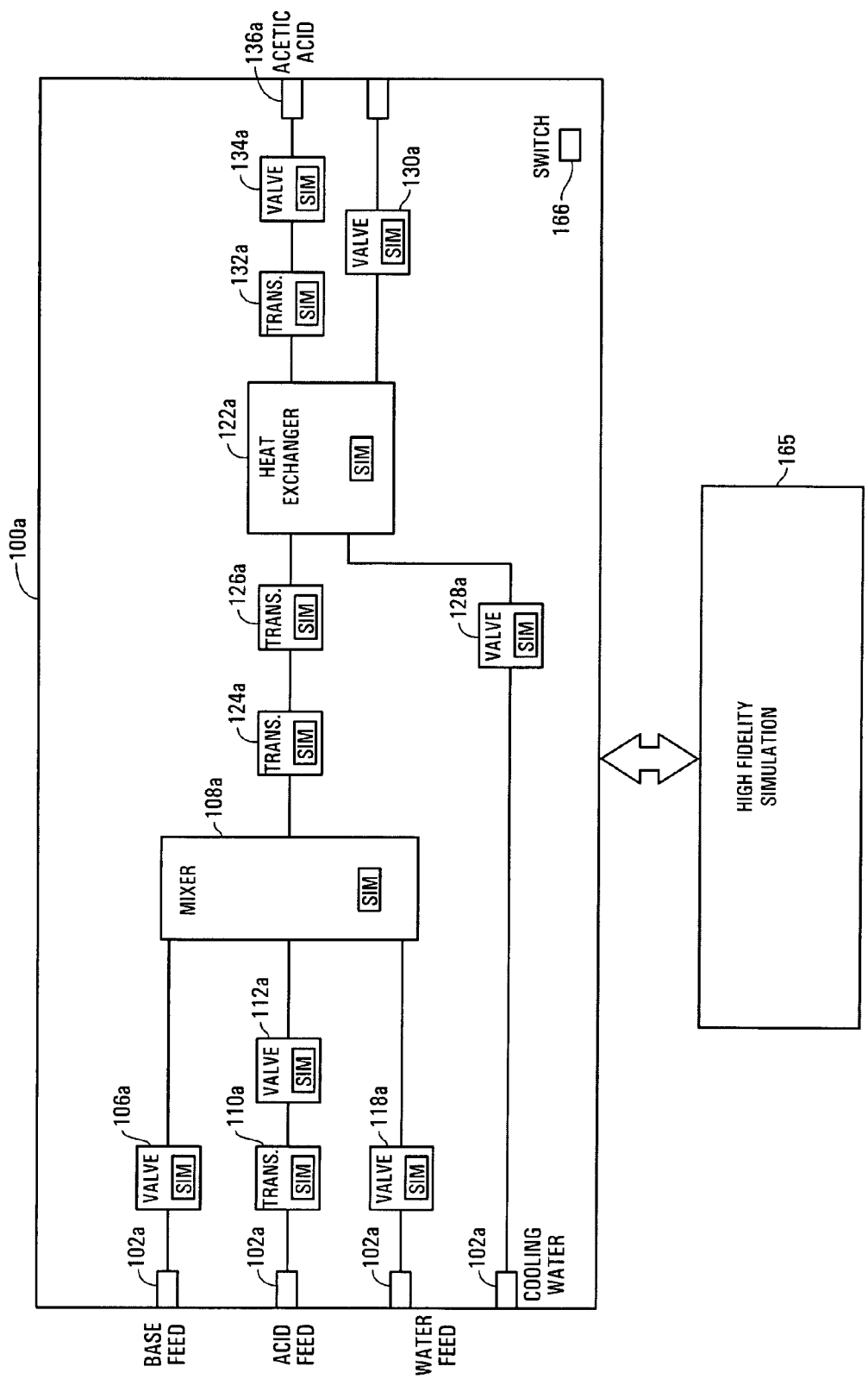
FIG. 6 is depiction of a process module associated with the process graphic display of FIG. 4, also illustrating the interconnection of a high fidelity simulation routine therewith.

FIG. 6 illustrates a process module 100a which corresponds to the graphic display 100 of FIG. 4. As will be seen, the process module 100a includes blocks that represent smart object simulations for each of the physical elements depicted in the graphic display of FIG. 4. For ease of understanding, each simulation block in FIG. 6 corresponding to an element in FIG. 4 is designated with the same reference number with an "a" added. Thus, the mixer simulation block 108*a* of FIG. 6 is a simulation corresponding to the mixer 108 depicted in FIG. 4. Similarly, the valve simulation blocks 106*a*, 112*a* and 118*a* correspond to and are communicatively tied to the valves 106, 112 and 118, respectively, depicted in FIG. 4.

The process module 100*a* of FIG. 6 thus includes a process simulation element (which may be represented as a function block associated with or specified by a smart process object) for each element depicted in the graphic display 100 and these simulation blocks are interconnected in the manner and using the connection elements specified in the graphic display 100. If desired, the process module 100*a* may be created automatically after creation of the graphic display 100 or even during creation of the graphic display 100.

As indicated above, each of the process simulation elements in the process module 100 includes simulation functionality (e.g., an algorithm, rules, transfer function, etc.) that is based on the behavior of the mechanical device used in the process and the nature of the stream(s) of material provided at the inputs to these simulation elements. These simulations are illustrated in FIG. 6 by the SIM blocks within each of the processing, actuator and transmitter elements. The dynamics of the devices and the effects on the streams may thereby be modeled or simulated within the process module 100*a*. Some possible properties that will be available for simulation blocks associated with actuator and processing elements may be outlet temperature (based on inlet temperature, flows and heat capacity), outlet flows (based on inlet mass flows and accumulation within the element), outlet pressure (based on assumed pressure drop across the unit or downstream pressure) and outlet composition (based on perfect mixing and inlet composition). When custom calculations are implemented, the built-in dynamics associated with the outlet properties may be added based on, for example, a first-order-plus-deadtime response to changes in the process inputs. The user may specify the deadtime and lag associated with each calculated property if desired. For process measurement elements, e.g., transmitters and switches, and connection elements, it may be assumed that no dynamics are introduced in the referenced property. However, transitions and other properties may be modeled if so desired. However, in many cases, the properties from the upstream connection may be immediately reflected in the downstream connection.

Using the process module 100*a*, the operation of the portion of the plant depicted in the process graphic 100 can be simulated. This simulation is integrated with the display 100 as values from the simulation elements within the process module 100*a* may be automatically communicated to and displayed in the graphics of the graphic display 100 and used in the control module. Similarly, the training instructor may use the display to effect or change properties in the simulation performed by the process module 100*a*.

If desired, a high fidelity simulation, such a one provided by HYSYS, CAPE, etc., may be added to the simulation features by defining I/O references for measurement and actuator elements and then using these references to automatically create the DCS interface table that is currently used in for example, HYSYS to perform I/O in a simulation. Standard processing element templates may be defined for each HYSYS (or other high fidelity simulation) component that may used to construct a high fidelity process simulation. Such a high fidelity simulation 165 is illustrated in FIG. 6 as being communicatively connected to the process module 100*a*. In this case, the user may select to disable the simulation provided in each of the simulation elements in the process module 100*a* and, instead, use the simulation parameters provided by the high fidelity simulation 165. The user may specify the use of the high fidelity simulation 165 by activating a switch 166 (which may be an electronic switch, a flag, etc. set within the process module 100*a*).

Generally speaking, when the switch 166 is set to use the high fidelity simulation 165, the associated simulation function blocks in the process module 100*a* act as shadow blocks, i.e., their simulation algorithm (SIM block) is not executed and the block parameters are instead read and written by the high fidelity simulation 165. However, the blocks in the process module 100*a* still communicate the same parameters and other information to the process graphic and control module and receive information from the process graphic 100 (ultimately for use in the high fidelity simulation 165) and control module 29.

As will be understood, the use of the process module in this manner provides an easy and convenient manner of connecting a high fidelity simulation package (software product) within a process plant in a manner that can be viewed and used by an operator, engineer, etc. (i.e., using the process graphic display 100 associated with the process module 100*a*). In particular, the stream parameters of the process modules may be connected up to or associated with flows modeled in the high fidelity simulation and pathing within the process module can be automatically structured or associated with the pathing within the high fidelity simulation. In effect, the process modules are used, in this case, as variable or data place holders that provide a convenient manner of mapping data within the high fidelity simulation package to the control modules and the graphic displays used in the process plant control and simulation environment.

Still further, the process modules and associated graphic displays reduce or eliminate the need to provide a separate display for the high fidelity simulation, which is typically currently produced by the high fidelity simulation provider at high cost to the user. Instead, because the process modules are already tied to graphic displays, when the process modules are connected to a high fidelity simulation package, the graphic displays may be used to provide information as calculated by the high fidelity simulation package to the user and to enable the user or operator to manipulate inputs to the high fidelity simulation package. Still further, because the process modules are communicatively connected to the control modules, the parameters or data generated by the high fidelity simulation package may be used in the control modules to perform on-line control activities. Using the process modules in this manner, a high fidelity simulation package can be executed in parallel to, in addition to being integrated with, the control modules.

As will be understood from the discussion provided above, the process modules and graphic displays may be created and run in an integrated manner to provide an operator view of a section of the process plant 10 along with a process module that simulates the operation of the process plant depicted by the graphic display. Advantageously, the process module and the graphic display may additionally be integrated with (e.g., communicatively connected with) one or more control modules that perform control activities with respect to that section or portion of the process plant. Thus, the control modules 29 illustrated in FIG. 1 may be communicatively integrated with one or more of the process modules 39 and graphic displays 35 illustrated in FIG. 1. Of course, the control modules 29, the process modules 39, and the graphic displays 35 may be implemented in any other computers or devices within the plant 10, as desired or necessary in any particular case, other than those illustrated in FIG. 1.

Figure 7A:
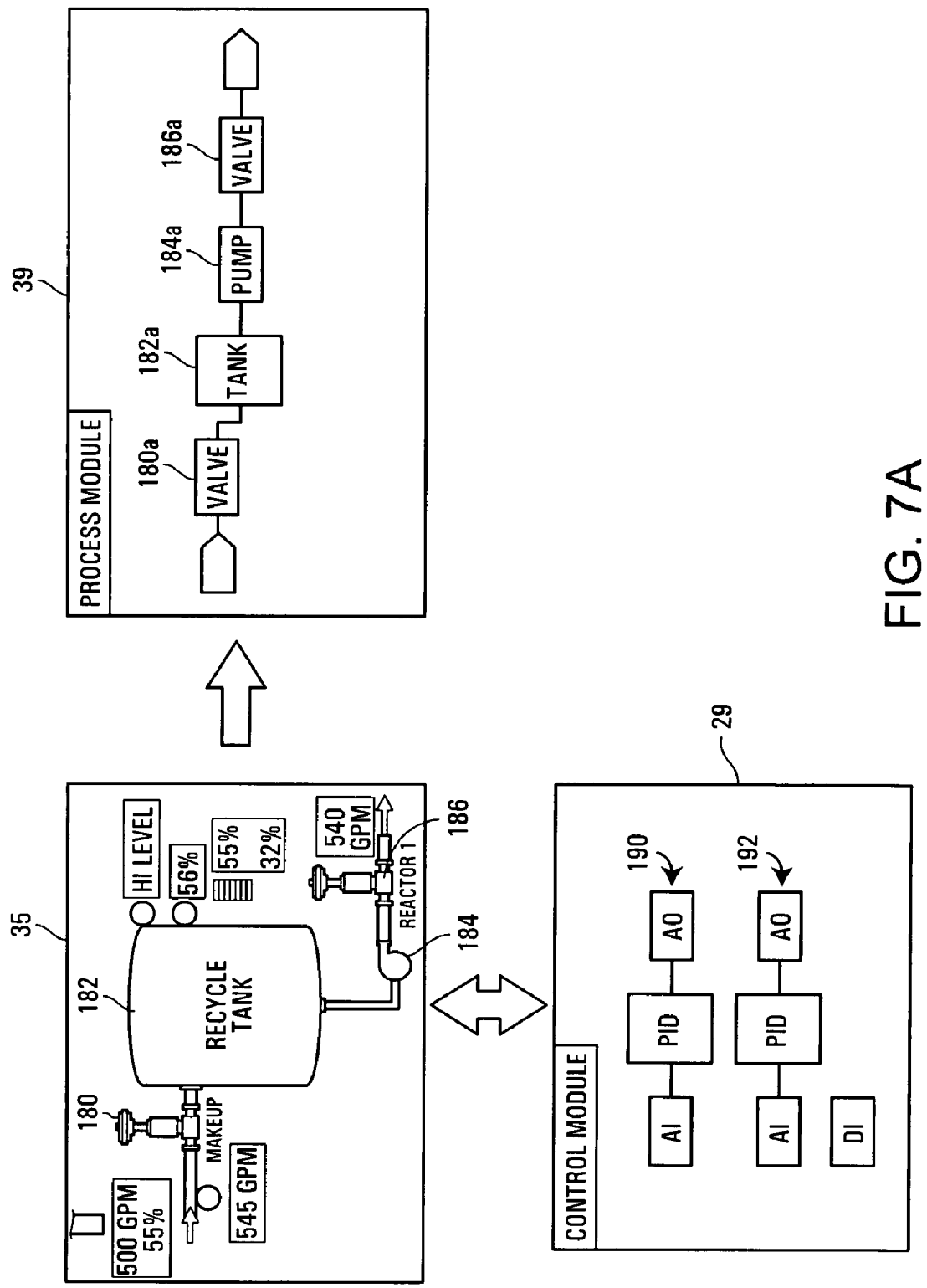
FIGS. 7A and 7B are logical block diagrams illustrating the communication interconnections between a graphic display, a process module and a control module as integrated within a process plant.
Figure 7B:
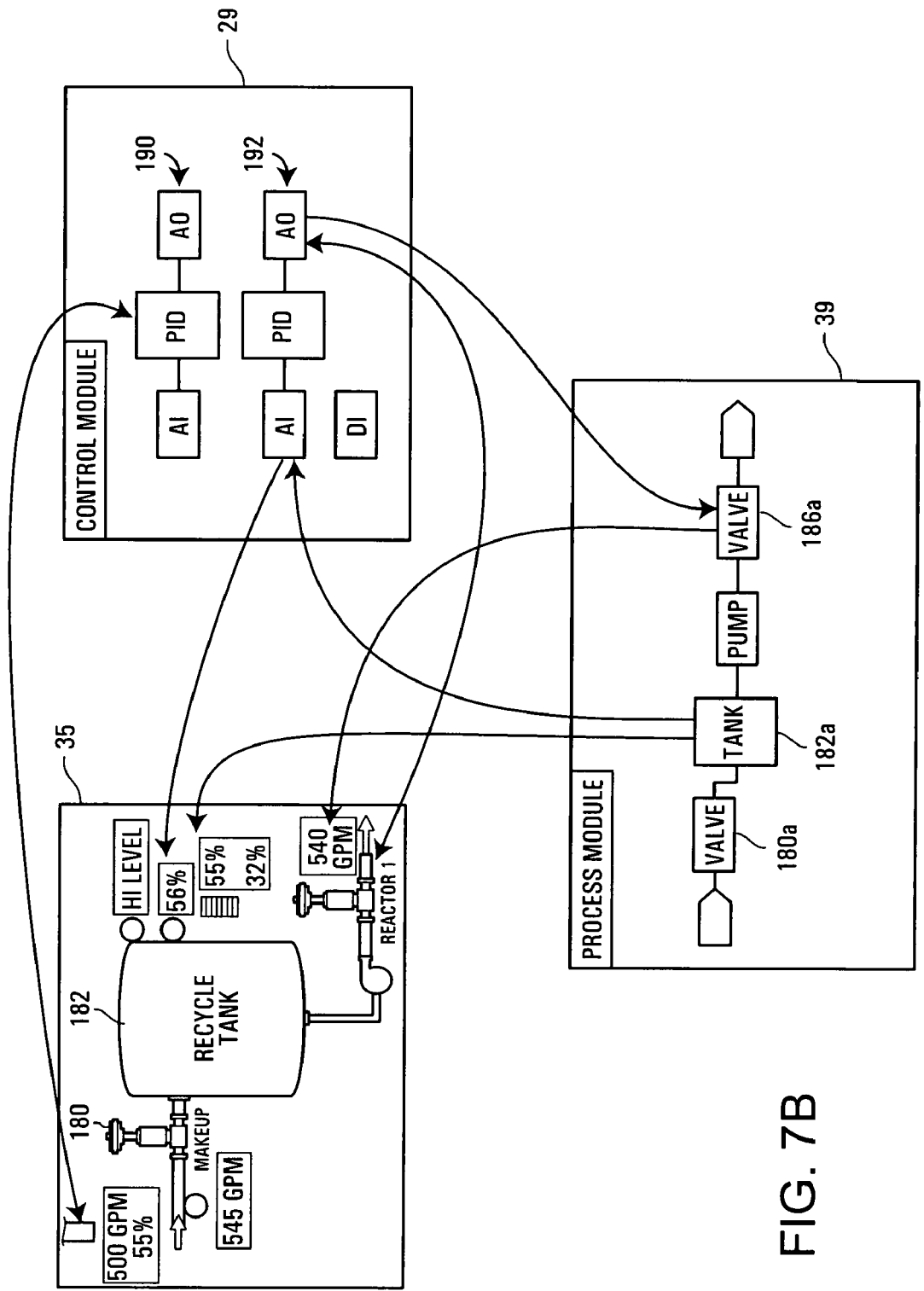

FIGS. 7A and 7B illustrate the integration of a control module 29, a process module 39 and a graphic display 35 in more detail. In particular, the graphic display 35 includes a valve 180 connected to an input of a recycle tank 182 and a pump 184 along with a valve 186 connected in series with an output of the recycle tank 182. The elements 180-186 are connected together via piping connection elements (not labeled) and stream elements are provided at the inputs and outputs of the graphic display 35 to define the streams of materials at those points.

As a result of the configuration of the graphic display 35, the process module 39, which may be created at the same time as the graphic display 35 includes process simulation elements in the form of a valve element 180a, a tank element 182a, a pump element 184a and a valve element 186a corresponding to the physical elements depicted in the graphic display 35. The control module 29, which controls at least some of the physical elements associated with (depicted in) the graphic display 35 includes a set of interconnected function blocks which provide control within or associated with the elements depicted by the graphic display 35 and by the process module 39. In this example, the control module 29 includes two control loops 190 and 192. The first control loop 190 has an analog input (AI) function block that receives flow input information about the flow of fluid into the tank 182, a proportional-integral-derivative (PID) control function block that performs PID control and an analog output (AO) function block that operates the valve 180 to effect the desired flow of material into the tank 182. In a similar manner, the control loop 192 includes an AI function block that provides tank level information as measured by a level sensor within the tank 182, a PID control block and an AO function block that receives a control signal from the PID control block to operate the valve 186 to effect control of the level of fluid within the tank 182. The control module 29 also includes a discrete input (DI) function block that indicates, for example, the on/off state or operation of the pump 184 and which may be used by the control loops 190 and 192 if so desired to perform control activities with respect to the tank 182.

As will be understood, any of the elements within any of the graphic display 35, the process module 39 and the control module 29 may communicate with others of those elements (via associated communication tags) to provide information back and forth between these different entities to thereby provide for better or enhanced control, simulation and operator displays, as will be explained in more detail. For example, as illustrated in FIG. 7B, the PID control block of the loop 190 may be configured to provide information to the graphic display 35 to display the current flow setpoint being used by the PID control element or may read the setpoint to be used in the control module 29 from the graphic display 35, as indicated by the arrowed lines between these elements. In a similar manner, the tank element 182a of the process module 39 may provide a simulation output to the AI function block of the control loop 192 of the process control module 29 indicating the simulated level of the tank, as determined by the simulation algorithm within the element 182a. This simulated tank level may also be illustrated on the graphic display 29 as additional information for viewing by the operator.

If desired, the AO block of the control loop 192 may provide information to and receive information from the valve 186 of the graphic display 35. Additionally, the AO function block of the loop 192 can be configured to provide its control output to the valve element 186a of the process module 39. In this case the valve element 186a may compare a predicted value for the valve position with an actual valve position being measured in the control loop 192 to determine if there may be some malfunction in the physical element. In the case of a difference over a certain amount, the process module 39 may include software that generates an alarm or an alert on the graphic display 35 that indicates a potential problem within the process plant, such as a faulty sensor, etc. As also illustrated in FIG. 7B, the valve element 186a may provide a simulated measurement or parameter to the graphic display 35 to be displayed or made available to the operator. Such a simulated measurement or parameter may indicate a simulated or predicted flow from the valve 186 or any other simulated parameter associated with the valve 186. Of course, any other desired information or data, including actual measured data, simulated data, or graphic display data may be provided to elements in the graphic display 35, the process module 39 and the control module 29 to provide for better or enhanced control, simulation or display.

Generally speaking, there are numerous advantages that may result by integrating a process module with a control module and, if desired, additionally with a graphic display. In one case, as mentioned above, the simulation performed by the process module may compare a simulated or predicted measurement, parameter or other process value with a measured or calculated parameter provided by the control module to detect potential problems within the system. For example, a great difference between the flow out of the valve as calculated by the process module 39 and as measured within the process itself may be a reason to generate an alarm indicating some device problem exists. Conversely, the control module 29 may use a simulated parameter to provide enhanced control in a situation in which the control module 29 knows of a faulty sensor or other element that is no longer active or available to the control module. In this case, the control module 29 can automatically replace a measured value or parameter (which may be known to be faulty, which may have a bad status, etc.) with a simulated output, as developed by the process module, without needing operator involvement and without having to shut the process down. Also, displaying both simulated and actual control data on the same display may help the operator or user detect problems within the plant, useful in a simulation mode, useful to perform better design activities, etc.

Figure 8:
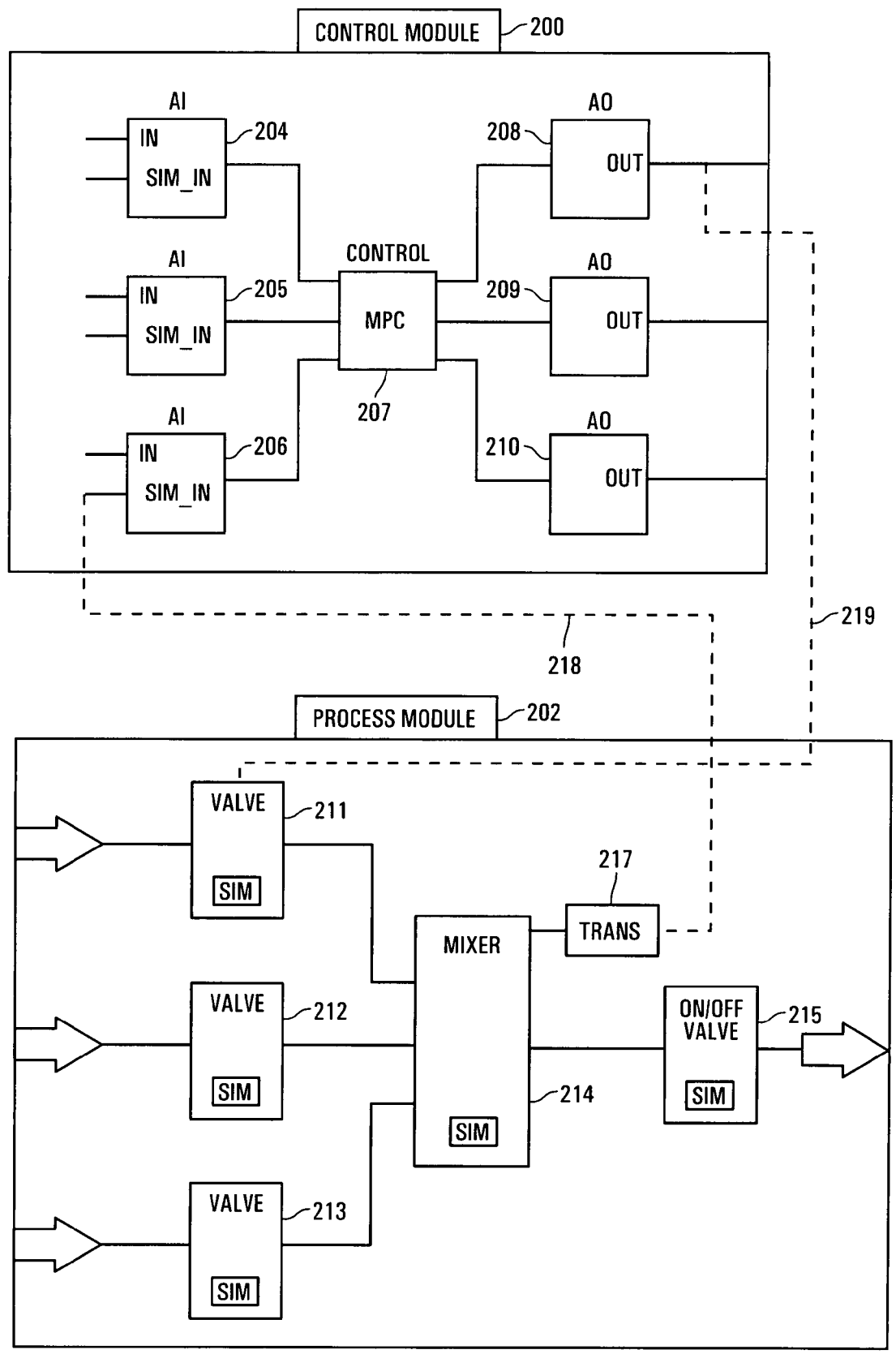
FIG. 8 is a simplified depiction of an example process module having blocks thereof interconnected with function blocks within a control module to provide advanced control and simulation capabilities.

FIG. 8 is a more detailed diagram of a manner in which a control module 200 may be communicatively integrated with a process module 202 (and thereby any graphic display associated with the process module 202). The control module 200 of FIG. 8 includes three AI function blocks 204, 205 and 206 having outputs thereof connected to a control function block 207, which may be, for example, a multiple-input/multiple-output control block, such as a model predictive control (MPC) function block. Three control outputs from the control block 207 are delivered to control inputs of three AO function blocks 208, 209 and 210 which may control, for example valves within a process that provide different fluids to a mixer for mixing.

The process module 202 is associated with the portion of the process having the mixer and valves controlled by the control module 200. In particular, the process module 202 has valves (actuator elements) 211, 212, and 213 which simulate the flow of three streams (depicted by arrows at the left hand side of the process module 202) into a mixer element 214. A valve element 215 simulates the flow of fluid out of the mixer element 214 to define an output stream on the right hand side of the process module 202 and a transmitter element 217 may indicate (or simulate) the measured composition of fluid exiting the mixer element 214. It will be noted that the connection elements, for the sake of clarity, are illustrated as simple lines in the process module 202.

In this case, the AO function blocks 208-210 may control the operation of the valves in the process plant depicted by the valves 211-213 (in the process module 202) while the control inputs to the AI function blocks 204-206 may be provided by a composition sensor, a flow sensor or other sensor in the process plant that is depicted by the transmitter 217 (in the process module 202).

As will be seen, logical elements within the process module 202 and the control module 200 may be communicatively interconnected to provide information from the process module 202 to the control module 200 and vice versa in desired or useful manners. In one example, a communication connection (illustrated by the dotted line 218) may be configured between the output of the transmitter element 217 of the process module 202 (which exposes the simulated measurement of the material composition in the mixer 214) and a simulated input SIM_IN of the AI block 216 in the process control module 200. In this manner, the simulated measurement of the level of fluid in the mixer 214 is provided to the AI block 206, and the AI block 206 may use this simulated input when, for example, the signal at the control input (IN) of that block has a bad status or is known to be faulty for some reason. In this manner, the AI block 206 may still provide an approximated value of the measurement associated with the AI block 206 when the actual physical measurement is not valid or not available, thereby enabling the control module 200 to continue to function and provide control in the presence of a faulty sensor. Such a connection may also enable the control module 200 to run in a simulated mode in which valid simulation data (as provided by the simulation process module 202) is used during off-line operator training or to test the control module 200.

Alternatively, or in addition, a communication connection (illustrated by the dotted line 219) may be configured between the output of the AO block 208 in the process control module 200 and an input of the valve element 211 which models the actual valve being controlled by the AO block 208 in the process plant. Here, the valve element 211 may use data obtained from the actual valve or sent to the actual valve to determine whether the simulated data (i.e., the measurements and parameters calculated by SIM block of the valve element 211) is correct or matches with the data used in the actual control routine 200. If there is a significant difference, the process module 202 may generate an alarm or alert indicating a potential problem or may use the real data to provide better or more accurate simulation within the process module 202. For example, the valve element 211 may use the actual control data in the SIM block for the position of the valve element 211 to reflect the actual valve position in the simulation. Of course, other connections between the elements in the process module 202 and the control module 200 may be made to provide data flow in either direction between these two modules for performing enhanced control and/or simulation. Still further, any of the data from the process module 202 or the control module 200 may be automatically made available to the operator via a graphic display associated with the process module 202.

If desired, the process modules may provide and simulate redundancy functions within a process control network or a process plant. In particular, the process modules may simulate the operation of actual redundant elements, such as redundant devices, redundant control blocks, etc. disposed within the process plant and be able to detect or simulate the operation of actual redundant elements (including, for example, when the back-up redundant element should take over, etc.) Additionally, if desired, a process module with its simulation capabilities may be used as one of a redundant pair of elements within a process plant. In this case, the process module (or any portion thereof) may operate as a back-up device providing back-up or redundant data (signals, calculations, etc.) in case of a failure of or a detected problem associated with the primary (and actual physical) device. In this case, the process module acting as the redundant element may be communicatively interconnected with the control modules (that perform control or sensing operations) in any known manner to provide the redundant capabilities. This use of process modules as redundant elements within the process plant is particularly useful when the process modules are connected to one or more high fidelity simulation packages in the manner described above.

It will be understood that the functionality of the smart process objects, the graphic display elements and the process modules described herein may operate in the operator workstation 20 and does not need to be downloaded to and configured within the controllers, field devices, etc. within the plant 10, which makes this functionality easier to implement, view, change, etc. Further, this functionality enables system level determinations to be made more easily than within the process devices, controllers, etc. because the information pertaining to the devices on a system level is all typically available to the operator workstation 20 in general and to the execution engine 48 in particular whereas all of this information is not typically made available to each controller and field device within the process plant 10. However, when it is advantageous to do so, some of the logic associated with the process modules, such as primitives, may be embedded in the devices, equipment and controllers down within the process plant. The use of smart process objects to create integrated process control modules and graphic displays enables the execution engine 48 to, for example, automatically detect leaks and produce smart alarms with minimal amounts of user configuration activities, to calculate and track flow and mass balances within the plant 10, to track losses within the plant 10 and to provide higher level diagnostics for the plant 10 and to simulate the operation of the plant during engineering design and operator training.

Figure 9:
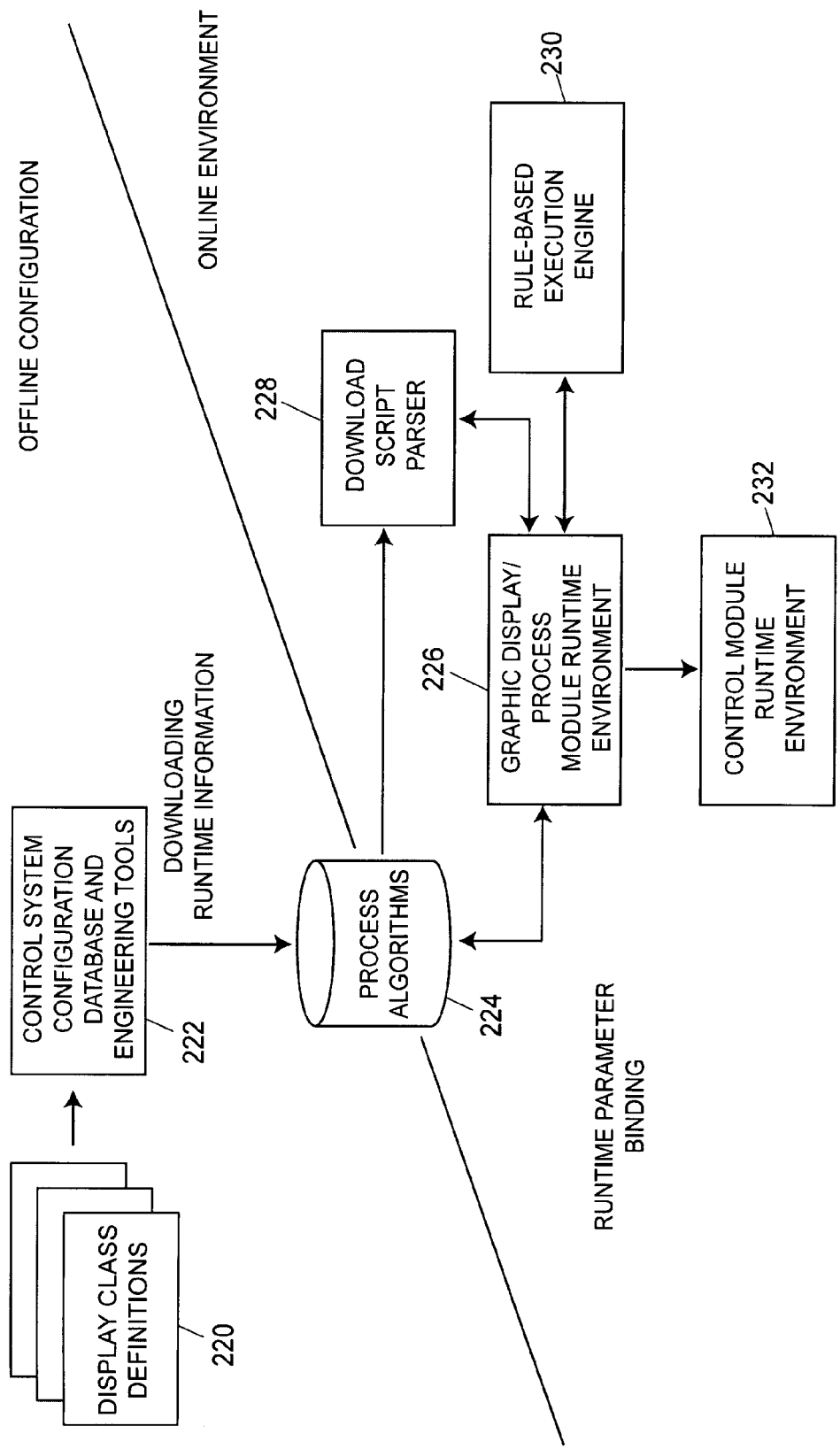
FIG. 9 is a logical block diagram of a manner in which process modules using smart process objects may be created in and implemented within an existing process control network.

FIG. 9 depicts one possible manner of integrating the execution engine 48 and the process modules and graphic displays used thereby within a process plant having a distributed control strategy. As illustrated in FIG. 9, the display class definitions 220 created by or associated with the process modules providing displays to an operator during execution by the execution engine 48 and are provided to the control configuration database and engineering tools 222 which may use and organize these display class definitions in any desired manner within the control strategy documentation. Process algorithms 224 may be connected to these display class definitions prior to runtime and then the display class definitions and flow algorithms bound thereto may be instantiated and provided to the graphic display/process module runtime environment 226 (which may be implemented in the form of one or more execution engines 48 in one or more workstations). The graphic display/process module runtime environment 126 uses a download script parser 228 to parse the code during execution (i.e., to perform just in time object code conversion) and uses a ruled-based execution engine 230 to execute flow algorithms or other rule based procedures provided for or bound to the display classes. During this process, the graphic display/process module runtime environment 226 may communicate with the control module runtime environment 232, which may be executed in controllers and field devices associated with the process, to provide data or information to the control module runtime environment 232 or to access data or other information from the control module runtime environment 232. Of course, the graphic display/process module runtime environment 226 may communicate with the control module runtime environment 232 using any desired or preconfigured communication networks, such as the Ethernet bus 24 of FIG. 1. Still further, other methods of integrating the graphic displays, process modules and control modules described herein into a standard process control system or process plant may be used as well.

As will be understood from the discussion provided above, the process modules and graphic displays may be created and run in an integrated manner to provide an operator view of a section of the process plant 10 along with a process module that simulates the operation of the process plant depicted by the graphic display. As described above, the process module and the graphic display may additionally be integrated with one or more control modules that perform control activities with respect to that section or portion of the process plant. Thus, the control modules 29 illustrated in FIG. 1 may be communicatively integrated with one or more of the process modules 39 and graphic displays 35 illustrated in FIG. 1. Of course, the control modules 29, the process modules 39, and the graphic displays 35 may be implemented in any other computers or devices within the plant 10, as desired or necessary in any particular case, other than those illustrated in FIG. 1.

Further, the process module and zero, one, or more, of the graphic display and a control module may additionally be integrated with (e.g., communicatively coupled with) one or more expert modules that may implement an expert system to help in the detection and/or management of abnormal situations with respect to that section or portion of the process plant. The expert system may utilize data from the process module such as process data and/or simulation data corresponding to physical entities associated with the process module, for example. An expert system generally analyzes data to detect specified patterns in the data. If a pattern is detected, the expert system may execute a set of actions corresponding to the detected pattern.

Figure 10:
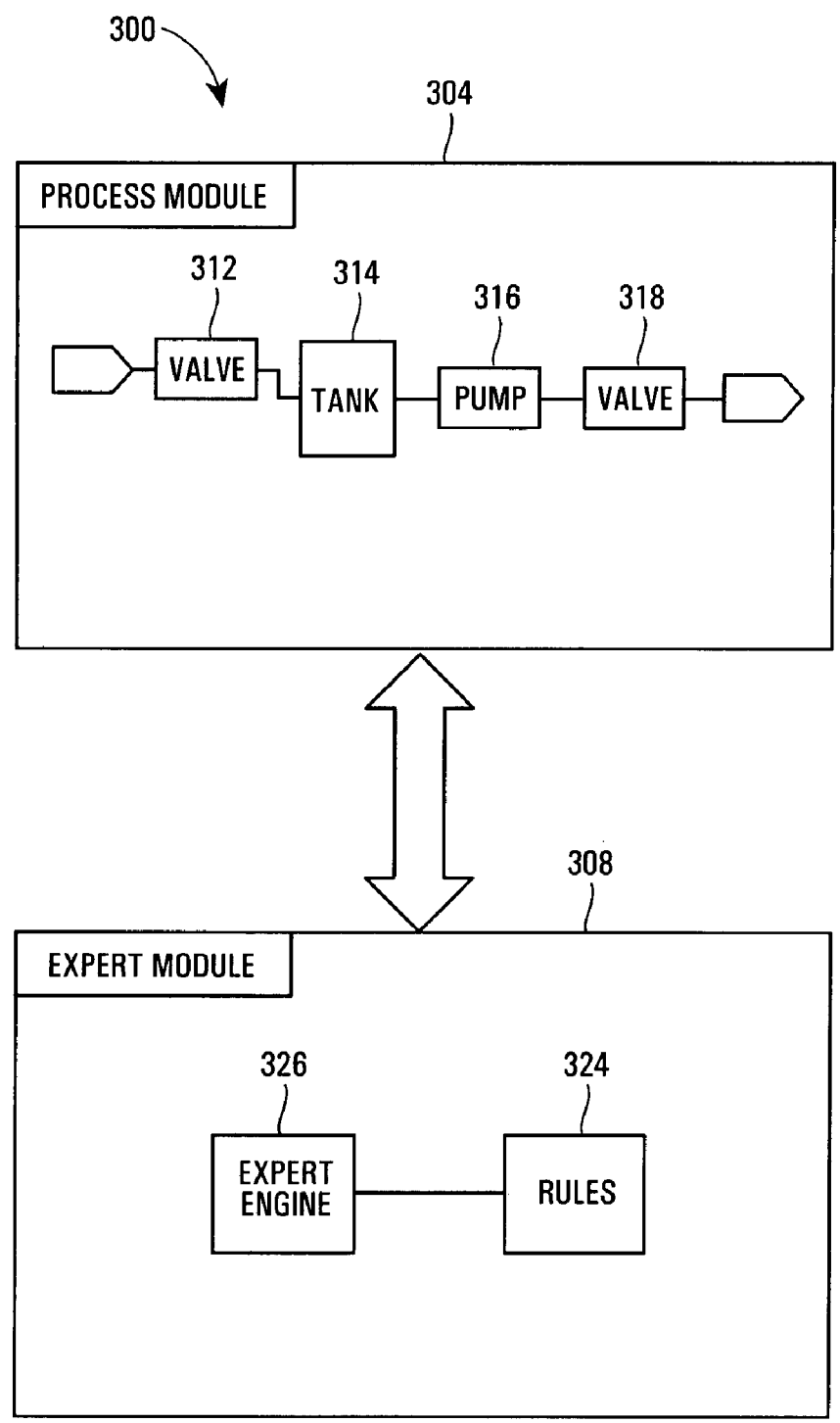
FIG. 10 is a block diagram of an example system in which a process module is integrated with an expert module.

FIG. 10 is a block diagram of a system 300 in which a process module 304 is integrated with an expert module 308. The process module portion 304 includes a valve block 312, a tank block 314, a pump block 316, and a valve block 318. An output of the valve block 312 is connected to an input of the tank block 314, and an input of the pump block 316 is connected to an output of the tank block 314. An output of the pump block 316 is connected to an input of the valve block 318. An input of the valve block 312 and an output of the valve block 318 are connected to stream elements (not labeled). The valve block 312, the tank block 314, the pump block 316, and the valve block 318 are connected in series via piping elements (not labeled).

The expert module 308 may provide an expert system to help detect and/or manage abnormal situations associated with at least some of the physical elements associated with the blocks in the process module 304 by utilizing at least process and/or simulation data from the blocks in the process module 304. In other words, the expert system may help to detect and/or manage actual abnormal situations in a process plant by utilizing at least data from the process module 304. Also, the expert system may help to detect and/or manage abnormal situations associated with a simulation of at least some of the physical elements associated with the blocks in the process module portion 304. In other words, the expert system may help to detect and/or manage simulated abnormal situations in the process plant. This may be helpful in configuring and/or designing control systems, safety systems, alarming systems, etc., and/or training operators, for example.

The expert module 308 may include a set of rules 324 and an expert engine 308 that applies the rules. The rules 324 may represent, for example, heuristics or "rules of thumb" that specify actions to be performed in different situations. Typically, a rule may include an "if" portion that specifies a particular set of facts that cause the rule to be applicable. Also, the rule may include a "then" portion that specifies actions to be taken if the "if" portion of the rule is satisfied. Often, the rules 324 may be configured to detect abnormal situations associated with the process module. In such implementations, the actions to be taken may be associated with notifying personnel that an abnormal situation has occurred or is occurring. Thus, the rules 324 may indicate actions to be taken such as generating an alert or alarm, displaying a notification on an operator screen, sending an email, sending a page to a pager, sending a text message to a portable communication device, etc. Similarly, the rules 324 may indicate actions to be taken such as screening alerts or alarms. For example, an underlying problem may result in a large number of alerts or alarms being generated for related equipment, measurements, parameters, etc. The expert module 308 could be used to help screen such resulting alerts and alarms so that they do not obscure the underlying problem. The actions to be taken also may be associated with correcting the abnormal situation and/or mitigating its effects. Thus, the rules 324 may also indicate actions to be taken such as overwriting a control signal value, overwriting a set point value, modifying an equipment setting, shutting down equipment, etc.

The expert engine 326 may evaluate the rules 324 as applied to data associated with the process module 304. For instance, the expert engine 326 may analyze data generated by or obtained from the process module 304. For example, any of the elements within the process module 304 may communicate with the expert module 308 (via associated communication tags) to provide information to the expert module 308 to thereby provide for better or enhanced control, simulation, and/or abnormal situation prevention. For example, the tank block 314 may be configured to provide process variables (e.g., a tank level measurement, an input flow measurement, etc.), alarms, parameters, etc., to the expert engine 326. Alternatively, the expert module 308 may be configured to obtain information from the tank block 314. Similarly, the valve blocks 312 and 318 may be configured to provide process variable data (e.g., a valve position, a control signal value, etc.), alarms, parameters, etc., to the expert engine 326, or the expert module may be configured to obtain information from the valve blocks 312 and 318.

Additionally, the expert engine 326 may analyze other data associated with the process module 304, such as past alarms and alerts, operator actions, set point changes, operating modes, etc. (stored in an event chronicle or data historian, for example) associated with process blocks in the process module 304, historic values of process variables, parameters, etc. (stored in a data historian, for example), future values of process variables, parameters, etc. (based on models such as step response models, first principals models, etc.). Further, the expert engine 326 may optionally analyze other types of data, such as data associated with other process modules, data associated with equipment not depicted in the process module 304, etc.

The expert engine 326 may comprise a CLIPS expert system tool, and/or any other suitable off-the-shelf or customized expert system tool, for example. Thus, one of ordinary skill in the art will recognize that a CLIPS expert system tool is not required. Although in FIG. 10 the expert engine 326 is depicted as a component of the expert module 308, the expert engine 326 could be separate from expert module 308. For example, one expert engine could apply the rules of a plurality of expert modules associated with respective process modules. Referring to FIG. 2, the execution engine 48 could include one or more expert engines 326, for example.

Also, although the expert module 308 is depicted in FIG. 10 as being separate from the process module 304, the expert module 308 could be incorporated within the process module 304. As just one example, the rules 324 could be part of the process module 304, and the expert engine 326 could be separate from the process module 304.

In general, a process module may include a plurality of interconnected process objects that, together, help to represent a process entity, a logical entity, a unit, etc., in the process plant. As described above, smart process objects include inputs and outputs to communicate data generated by, stored within, etc., between smart process objects, non-smart process objects, control modules, process graphics, etc. Thus, a process module may provide a single object in which a variety of data is available from a number of devices associated with some physical or logical unit of the process plant.

Because, in the system 300, the process module 304 is integrated with the expert module 308, the expert system can be more easily configured than in past systems utilizing an expert. For example, the process module 304 could automatically make available some or all of its data to the expert module 308. In past process systems that utilized an expert system, on the other hand, an operator would need to manually determine and configure the data that was to be provided to the expert system, which could be time consuming. Similarly, because a process module, such as the process module 304, may have an associated process graphic, it may ease configuration of the expert module if such configuration may be performed with reference to the process graphic. Further, because the process module 304 may provide modeling and/or simulation capabilities, the expert module 308 can conveniently have access to data generated by the process module 304 using these capabilities. Still further, process module classes with associated expert rules may be created. For example, default rules for an expert could be configured for a process module class. Then, when an instance of the process module class is created, it may be provided with the integrated expert module having the default rules. A user could then modify the default rules, if desired, or merely utilize the default rules for the process module instance, for example.

The process module 304 and/or process objects within the process module 304 may include additional parameters to support integration with the expert module 308. For example, one or more process objects may include a parameter, or existing parameters may be modified, to indicate if there is a fault (e.g., a fault in a measurement). For instance, the expert module 308 may determine that a sensor is faulty, and may then modify the process module 304 to indicate that the measurement associated with the sensor may be faulty. This data could be utilized by other process blocks, control modules, etc. Similarly, this data could be reflected in a process graphic of the process module to indicate detected faults to an operator. In general, outputs generated by, internal states of, rule evaluations of, etc., the expert module 308 may be exposed as parameters of the process module 304 and/or of process objects of the process module. Thus, these exposed parameters can be referenced by the process graphic of the process module, other modules, etc.

Additionally, one or more process objects may include a parameter, or existing parameters may be modified, to permit screening of alerts and/or alarms. Similarly, the process module 304 may include a parameter, or existing parameters may be modified, to permit screening of alerts and/or alarms. For example, the expert module 308 may detect an underlying problem associated with the process module 304, and may modify the process module 304 to screen alarms that may generated as a result of the underlying problem but that do not explicitly indicate the underlying problem. As discussed above, such alarm screening may help prevent the underlying problem from being obscured.

Referring to FIGS. 1 and 10, at least the expert rules 324 for the process module 304 could be stored in the configuration database 28. In this way, the rules 324 could utilize tags and/or aliases to reference elements of the process module process or of other process modules such as properties, parameters, modes, states, etc. Additionally, if the process module 304 was changed, updated, renamed, etc., by a configuration engineer, for example, the expert module 308 could still reference information from the process module 304 using the tags and/or aliases. Similarly, if a parameter, for example, referenced by the expert module 308 was deleted by a configuration engineer, the configuration software could alert the configuration engineer that the parameter was referenced by the expert module 308. Thus, in general, integrating the expert module 308 with the process module 304 and/or storing expert rules 324 in the configuration database 28 may help keep the expert rules 324 up to date with changes to configurations of the process plant. Additionally, many configuration databases utilize version control techniques to track versions of configurations. Thus, versions of the rules 324 could be tracked if they are stored in the configuration database 28.

Referring to FIGS. 9 and 10, expert modules associated with the process modules may be provided to the control configuration database and engineering tools 222 which may utilize the expert modules in any desired manner within the control strategy documentation. The expert rules 324 may be associated with display class definitions prior to runtime and then the display class definitions and expert rules bound thereto may be instantiated and provided to the graphic display/process module runtime environment 226 (which may be implemented in the form of one or more execution engines 48 in one or more workstations). The expert rules may be applied by an expert engine implemented by the graphic display/process module runtime environment 226 or the rule-based execution engine 230, for example. In such an implementation, the expert modules 308 may have access to a wide range of real-time data (and optionally non-real-time data as well). For example, if an operating system such as the version of the Microsoft® Windows® operating system code-named "Longhorn" is utilized, the expert module 308 may have access to real-time and non-real-time data provided by various data sources via services.

Further, other modules may have access to real-time values of states, parameters, properties, etc., of the expert modules 308. For example, process graphics displayed on operator workstations may be modified based on data from one or more expert modules 308. As just one example, if an expert module 308 determines that a sensor is defective, a process graphic displayed on an operator workstation could be modified to indicate the defective sensor. For example, a color of a depiction of the sensor could be changed, the depiction of the sensor could be flashed on and off, a window could be displayed next to the depiction of the sensor indicating it may be defective, etc. Additionally, the expert module could generate alerts and alarms and could screen alerts and alarms of other modules, for example. Further, if an operating system such as the version of the Microsoft® Windows® operating system code-named "Longhorn" is utilized, the expert module 308 provide data to other modules via services.

Further, an operator could examine and/or modify an expert module 308 during runtime. For example, an operator could modify a process graphic during runtime to view additional parameters, states, modes, etc., of the expert module 308. Similarly, an operator could modify the rules 324 during runtime. For instance, an operator could add additional rules, modify rules, delete rules, disable and/or enable rules, etc.

Generally, a user interface for configuring an expert module such as the expert module 308 may include a set of predefined rules that may be utilized by an operator. For example, predefined rules may include predefined fact templates and corresponding action templates corresponding to actions to be taken in response to the facts. For example, fact templates and action templates may be provided for a particular process plant entity or unit, such as a heater unit. If the user decides to utilize a particular fact template and a particular actions template for a heater process module, an expert module configuration application may automatically create a rule corresponding to the fact template and the action template. Further, the rule may be automatically bound to the correct process objects in the process module. Additionally, a user may be permitted to modify the predefined rules and/or create new rules. For example, an operator may be permitted to browse and select facts associated with the process plant. Further, a user may be permitted to create new rules suitable for evaluation by a CLIPS expert system tool or some other suitable expert system tool.

Further, the user interface may permit a user to observe the operation of the expert module during operation. For example, facts specified by the rules 324 may be displayed to the user during execution of the expert module. Further, the user may be able to modify and/or specify these facts in order to observe the operation of the expert module 308 in response to those facts. Further, the user interface may permit the user to insert break points within the rules so that the state of the expert module at the break points may be observed, for example.

Figure 11:
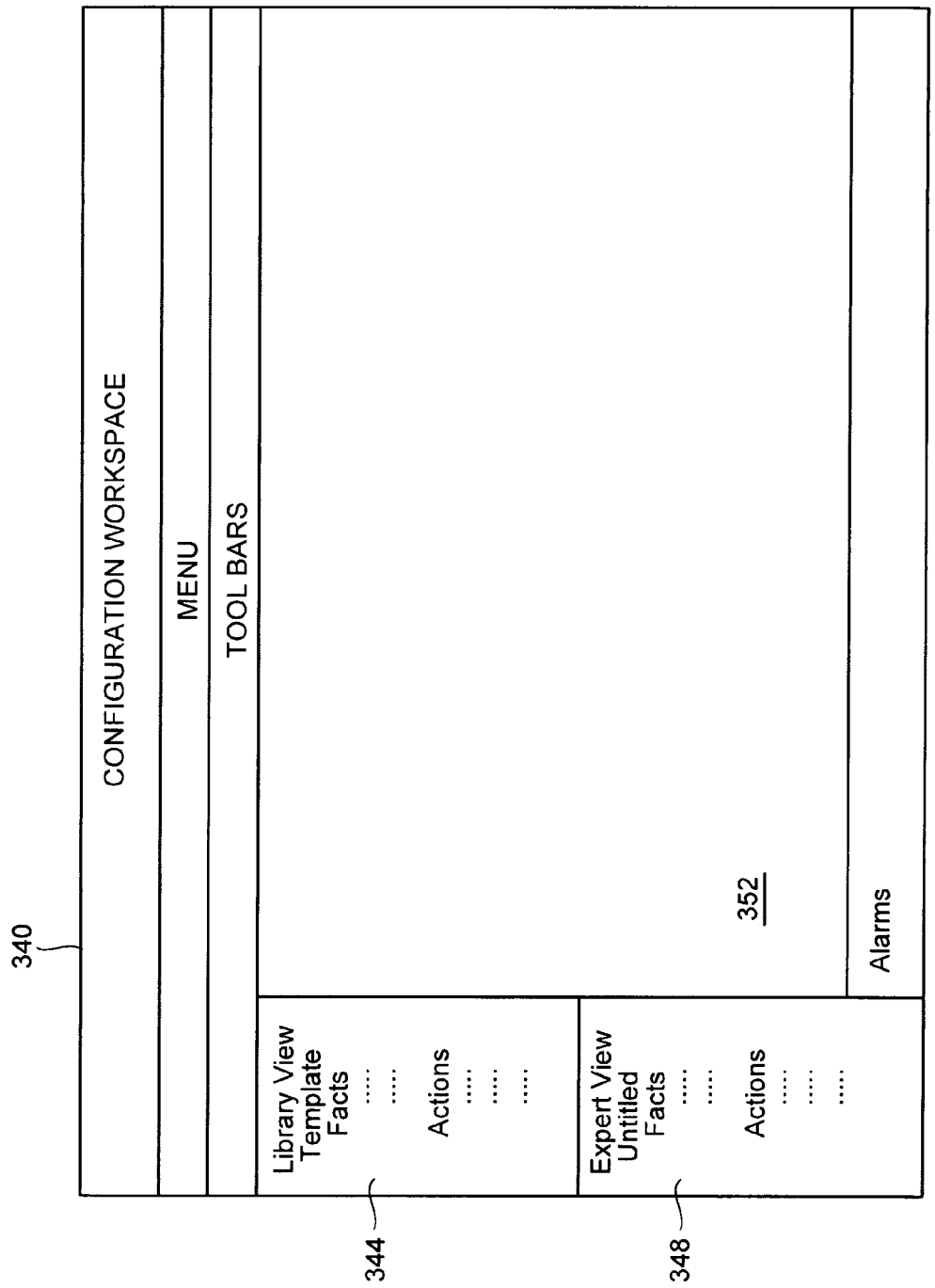
FIG. 11 is an example display that may be utilized by an expert module configuration application to facilitate configuration of an expert module.

FIG. 11 is an example display 340 that may be utilized by an expert module configuration application to facilitate configuration of an expert module. The display 340 includes a library portion 344, an instance portion 348, and an informational portion 352. The library portion 344 may include indications of templates that can be used to created instances of rules. The templates may comprise fact templates and action templates, for example. For instance, the fact templates can be use to create an "if" portion of a rule and the action templates can be used to create a "then" portion of the rule. To create an instance of a fact or an instance of an action, a user could drag a fact or instance template from the portion 344 and drop it in the portion 348, for example.

If a user selects a particular fact, fact template, action, or action template in the portion 344 or the portion 348, additional information regarding the selected fact, fact template, action, or action template may be displayed in the informational portion 352. The informational portion may permit the user to modify the displayed information. Thus, a user can modify the selected fact, fact template, action, or action template.

Figure 12:
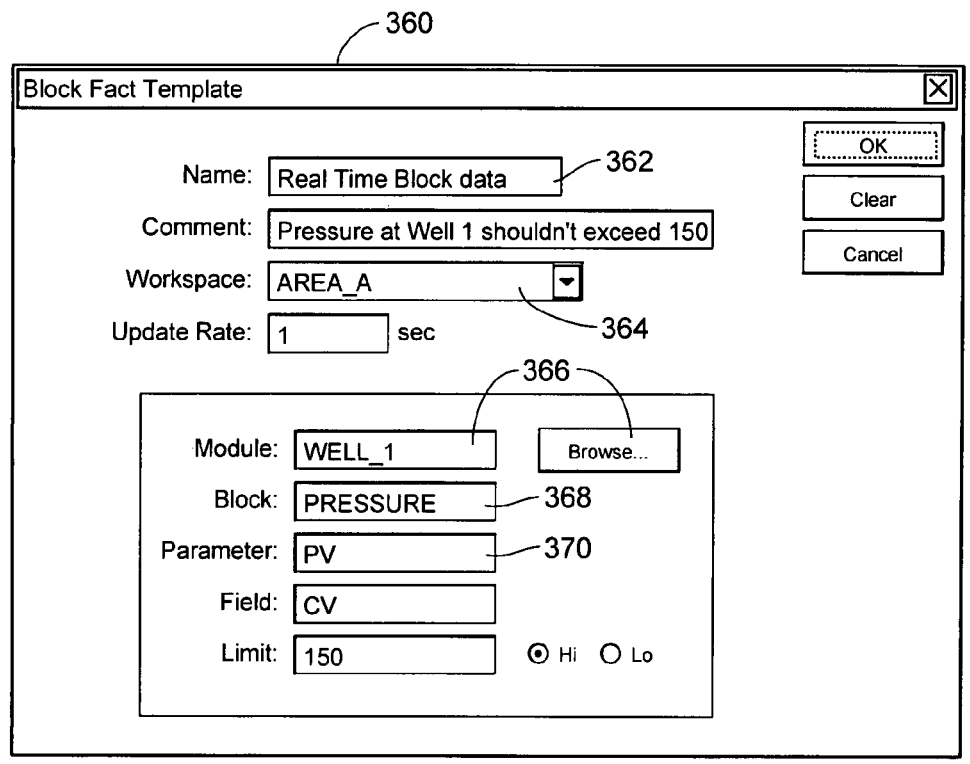
FIG. 12 is an example display that may be utilized to define a fact template.

FIG. 12 is an example display 360 that may be used to define a fact template. The display 360 may include a user interface mechanism 362 (e.g., a text box or the like) to create a name for the fact template, and a user interface mechanism 364 (e.g., a text box, a pull down menu, a button to cause a pop-up window to be displayed, etc.) to select a logical area in the process plant associated with the fact template. The display 360 may also include a user interface mechanism 366 (e.g., a text box, a pull down menu, a button to cause a pop-up window to be displayed, etc.) to allow a user to select a particular process module or process module class, for example, with which the fact template is to be associated. Similarly, the display 360 may permit a user to select a particular process block via a user interface mechanism 368 and to select a particular parameter of the process block via a user interface mechanism 370.

Figure 13:
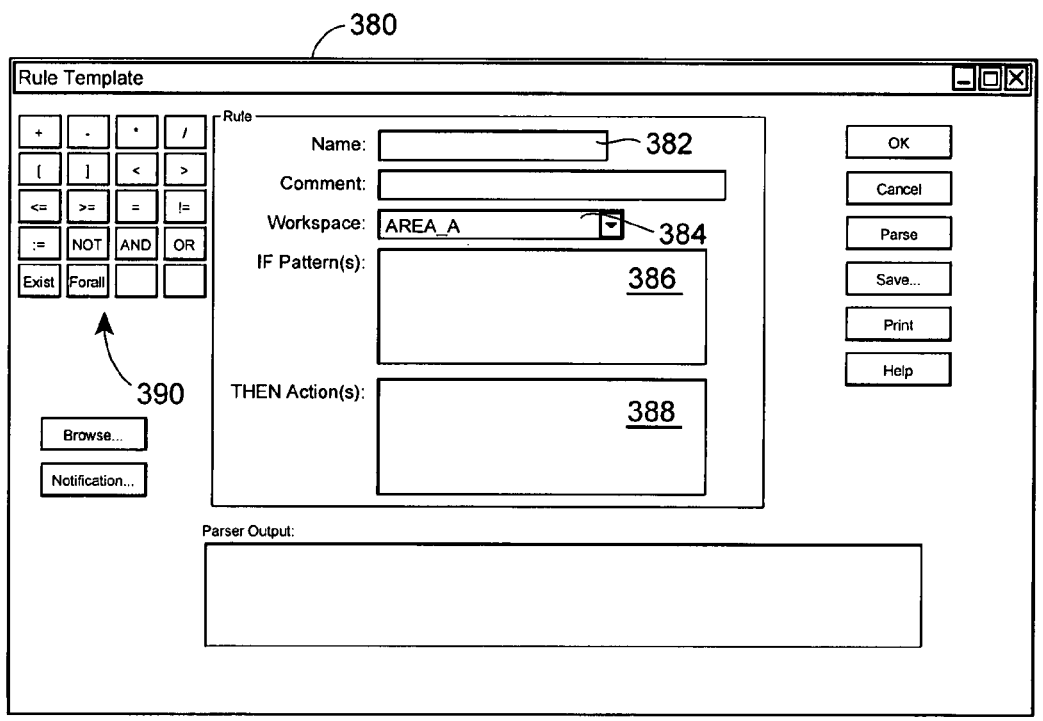
FIG. 13 is an example display that may be utilized to define a rule template.

FIG. 13 is an example display 380 that may be used to define a rule template. The display 380 may include a user interface mechanism 382 (e.g., a text box or the like) to create a name for the rule template, and a user interface mechanism 384 (e.g., a text box, a pull down menu, a button to cause a pop-up window to be displayed, etc.) to select a logical area in the process plant associated with the rule template. The display 380 may also include a portion 386 to allow a user to define an "if" portion of the rule template. Similarly, the display 380 may include a portion 388 to allow a user to define a "then" portion of the rule template. A user could define the "if" and "then" portions using a syntax such as used in CLIPS or in any other suitable expert system. Buttons 390 may be provided to assist the user in more quickly creating the rule template.

Figure 14:
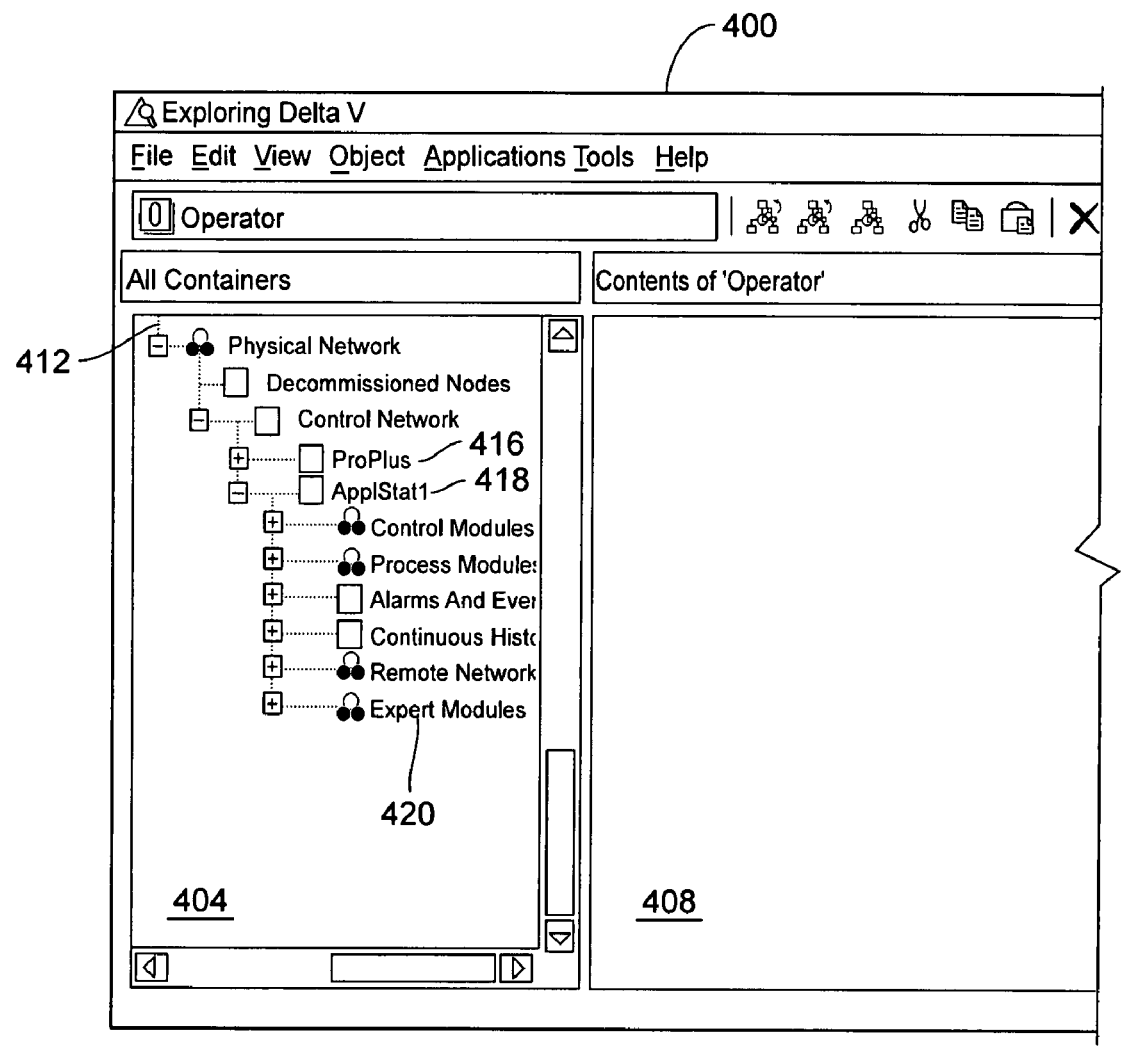
FIG. 14 is a portion of an example display that can be used to assign expert modules to be executed by a particular node in a process plant.

An expert module may be able to be assigned to a particular node (e.g., workstation, controller, etc.) within the process plant for execution. Thus, the node on which the expert module is executed may be the same as or different than the node on which the expert module was configured. In one implementation, the expert module is assigned to the same node as the process module with which it is associated. Alternatively, the expert module and the process module may be assigned to different nodes. As just one example, an expert module could be assigned to a node using graphical techniques. FIG. 14 is a portion of an example display 400 that can be used to assign expert modules to be executed by a particular node (e.g., a workstation, a controller, etc.) in the process plant 10. The display includes an explorer portion 404 and an informational portion 408. The explorer portion 404 includes a tree structure 412 that may include folders 416 and 418 corresponding to workstations in the process plant 10. The folder 418 includes an expert modules folder 420. An expert module can be assigned to the node corresponding to the folder 418 by dragging an item corresponding to the expert module to the folder 420 or, optionally, the folder 418. Optionally, an expert module could be assigned to a node by similarly dragging a process module item corresponding to the expert module to the desired node folder.

Figure 15:
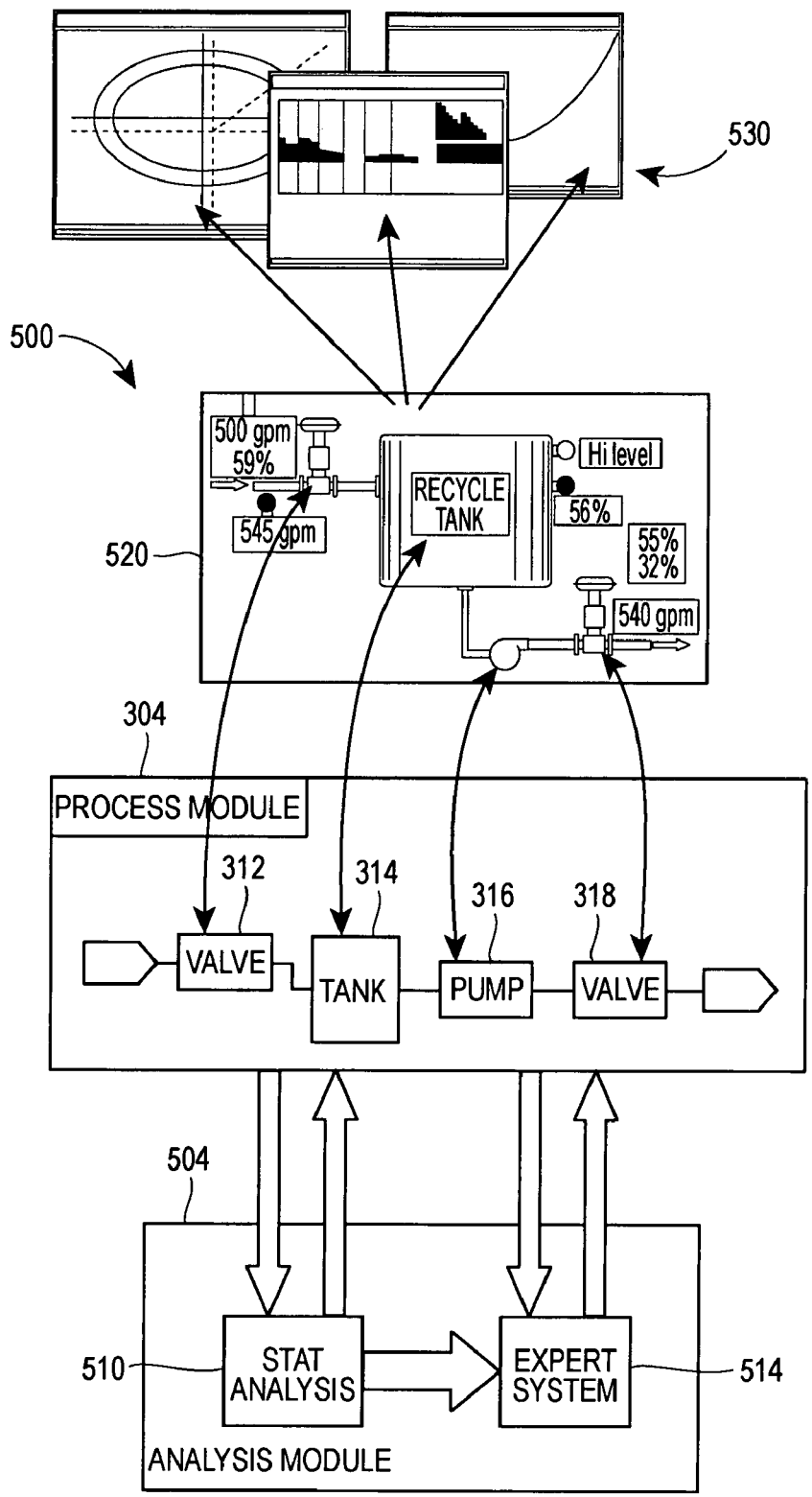
FIG. 15 is a block diagram of an example system in which a process module is integrated with an analysis module.

As described above, data from a process module may be provided to an expert system integrated with the process module. It will be understood by those of ordinary skill in the art that data from the process module could be processed, analyzed, etc., prior to being provided to the expert system. For instance, FIG. 15 is a block diagram of an example system 500 in which the process module 304 is integrated with an analysis module 504. The analysis module may include a statistical analysis system 510 and an expert system 514. The statistical analysis system 510 will be discussed in greater detail below. The expert system 514 may include an expert engine and a set of rules similar to that discussed above with respect to FIG. 10.

The statistical analysis system 510 may utilize multivariate statistical process control (MSPC) techniques to facilitate detecting and/or isolating abnormal situations such as process and measurement faults. Two statistical projection techniques used in MSPC have been developed to address the requirements in the process industry: Principle Component Analysis (PCA) and Partial Least Squares (PLS). The statistical analysis system 510 may utilize one or both of PCA and PLS, or could utilize one or more other techniques. Additionally, two statistics commonly used in conjunction with MSPC in fault analysis are Square Prediction Error Q (a measure of lack of model fit) and Hotelling's T2 (a measure of the variation within the PCA model). Thus, the statistical analysis system 510 may optionally utilize techniques employing Square Prediction Error Q and/or Hotelling's T2.

As illustrated in FIG. 15, a user may be presented a graphic display 520 corresponding to the process module 304. As one example, the user may configure the analysis module 504 with reference to the graphic display 520. As another example, the user may configure the analysis module 504 with reference to a display of the process module 304. Alternatively, the user may configure the analysis module 504 without reference to the graphic display 520 or the display of the process module 304.

The user may elect to use all correlated process and simulated data associated with the process module 304 to be automatically included in a PCA or the user may elect to include only a portion that data. Correlated data may be automatically determined utilizing the process connections in the process module 304, for example, and may be automatically included in the calculations. Further, the user may elect to use data associated with other portions of the process plant (e.g., data from other process modules, control modules, etc.) Also, the user may elect to examiner certain time periods in which data is to be examined. In this case, an historic plot of parameters could be displayed to the user and the user could then be given the option to select a time frame to be considered in generation of a PCA. The PCA could then be automatically generated using the selected time frame of data.

Once a PCA is created, the pattern of square prediction error, for example, could be analyzed to detect an abnormal situation, such as a faulty sensor, using the expert system 514. Graphic elements associated with equipment related to the abnormal situation (e.g., a faulty sensor) may then be automatically highlighted on an operator screen. For example, graphic elements could be highlighted, animated, or otherwise graphically indicated to the user, on the process graphic 520. Because the analysis module 504 is integrated with the process module 304 (which is in turn integrated with the process graphic 520), a separate graphic display for indicating problems with process plant equipment detected by statistical analysis is not necessary in the system 500. Of course, one of ordinary skill in the art will recognize that, in other implementations, a separate graphic display may be utilized.

One method of detecting sensor fault that may be utilized is described in U.S. Pat. No. 5,680,409, entitled, "Method and apparatus for detecting and identifying faulty sensors in a process," which is hereby incorporated by reference herein. The analysis module 504 may utilize techniques described in U.S. Pat. No. 5,680,409, but may also use various other techniques as well.

Of course, the analysis module 504 may be utilized to detect other abnormal situations in addition to sensor faults. Detection of abnormal situations in plant operation may permit preventative measures to be taken by alerting an operator to the situation when it can be addressed before the situation progresses to a point where equipment is damaged, an emergency arises, etc.

Similar to the expert module described with reference to FIG. 10, the expert system 514 may be provided with default rules. For example, default rules to analyze a square prediction error (SPE) associated with data generated by the statistical analysis system 510 could be provided. A rule of the expert engine could be defined to identify a range of the SPE for a variable generated by the statistical analysis system 510, the range associated with a particular abnormal situation, for example. This range value could be established by an engineer viewing historic data for the parameters in the module PCA. When an engineer identifies the time that an abnormal condition existed, the SPE value may be automatically saved as the fact range value for the identified condition. The fact range value may be established by an operator when he identifies that an abnormal condition has occurred during normal operation, for example. Later, if the expert system 514 detects a pattern in which the SPE value falls within the range, an alert or alarm indicating the abnormal condition could be generated, for example.

The expert system 514 may also be used to detect an abnormal situation such as a degradation of process performance. For example, the heat transfer coefficient associated with a heater may be accurately determined through the simulation capability provided by the process module. Improper equipment setup, and/or wear or buildup in pipes and heat-transfer surfaces may alter the behavior of equipment and/or cause degradation of process performance, for example. The automatic detection of significant process changes and/or process performance degradation may help prevent equipment damage and/or production losses, for example.

The expert system 514 may also be used to analyze and/or screen alarms associated with an abnormal situation, for example. For instance, an underlying cause of a problem could be detected using a variety of techniques, including known techniques. The underlying problem could lead to alarms being generated that do not directly identify the underlying cause. Information provided by the process module 304 and/or process objects within the process module 304 could be used to permit alarm screening to be enabled or disabled. For example, alerts could be prioritized so that the operator may be less distracted from an overload of alerts resulting from the abnormal situations. In this manner, the operator may be able to more quickly recognize the underlying problem.

The expert system 514 may, in addition to receiving data from the statistical analysis system 510, receive process and/or simulation data directly from the process module 304. Also, the expert system 514 may receive data other sources such as other process modules, control modules, alarms, alerts, data historians, event chronicles, etc.

The statistical analysis system 510 may be configured to generate plots of statistical analysis data such as time series plots and/or bar graph plots of principle component scores, scores contributions, etc. Because the module 504 is integrated with the process module 304, such plots and/or graphs could be displayed in response to a request from the user via the graphic display 520, for example.

Although in FIG. 15, the statistical analysis system 510 and the expert system 514 are illustrated as being within a single analysis module 504, one of ordinary skill in the art will recognize that the statistical analysis system 510 and the expert system 514 could implemented in separate modules. For example, the expert system 514 could be implemented as an expert module similar to the expert module 308 of FIG. 10, and the statistical analysis system 510 could be implemented as a statistical analysis module. The statistical analysis module and the expert module could be integrated with the process module 304 in a manner similar to the techniques described above.

In another embodiment, a system for monitoring operation of a process plant having a process control module for implementation of control routines using a set of process measurements and involving a plurality of physical devices within the process plant, may include a process simulation module and a PCA module. The process simulation module may have having simulation elements in connected arrangement to model the plurality of physical devices. The simulation elements may be in communication with the process control module during the implementation of the control routines to generate a set of simulated operational parameters that model the operation of the process plant. The PCA module may be in communication with the process simulation module and may be configured via the connected arrangement of the simulation elements and the set of simulated operational parameters to define a normal operational state of the process plant for use in monitoring the set of process measurements and the operation of the process plant. The PCA module may generate a principal component output indicative of an operational state of the process plant. The principal component output may be derived from the set of process measurements.

In another embodiment, the system may comprise an expert analysis tool in communication with the PCA module to receive the principal component output. The expert analysis tool may analyze the principal component output to detect whether a fault condition exists in the operational state. The expert analysis tool may have a plurality of expert rules for comparing the principal component output with principal component data defining the normal operational state to determine whether the fault condition exists.

In yet another embodiment, the system may include a graphic depiction module that generates a graphic display of the connected arrangement of the simulation elements, wherein the expert analysis tool provides data indicative of the fault condition to the graphic depiction module, and wherein the graphic depiction module displays the data by modifying the graphic display of the simulation elements associated with the one or more physical devices implicated by the fault condition. The graphic display may include a user interface for selection of one of the simulation elements, and wherein the selection generates a principal component data display of information related to the selected simulation element.

The selection of one of the simulation elements via the user interface may provide a configuration tool for user definition of an expert rule associated with the selected simulation element for subsequent use by the expert analysis tool. Also, the selection of one of the simulation elements via the user interface may provide a PCA configuration tool provided for user definition of the set of simulated operational parameters utilized by the PCA module to define the normal operational state. The user definition of the set of simulated operational parameters via the PCA configuration tool may include selection of a time period from which to draw data for one or more of the simulated operational parameters.

The principal component output may be derived further from a current value of one of the set of simulated operational parameters such that the PCA module analyzes the current value in combination with the set of process measurements in monitoring the operation of the process plant. The current value may be predictive of a future operational condition of the process plant such that the principal component output is indicative of a future operational state. Also, the current value may be associated with a simulation parameter indicative of a non-measured operational condition of the process plant. The non-measured operational condition may be an unmeasurable operational condition.

In yet another embodiment, a method of monitoring operation of a process plant having a process control module for implementation of control routines using a set of process measurements and involving a plurality of physical devices within the process plant, may include simulating the operation of the process plant by generating a set of simulated operational parameters using simulation elements in connected arrangement that model the plurality of physical devices, the simulation elements being in communication with the process control module during the implementation of the control routines. The method may also include generating principal component data defining a normal operational state of the process plant using PCA based on the connected arrangement of the simulation elements and the set of simulated operational parameters. The method additionally may include monitoring the operation of the process plant by analyzing the set of process measurements in view of the principal component data of the normal operational state.

The method may also include generating a principal component output indicative of an operational state of the process plant by deriving the principal component output from the set of process measurements.

The monitoring step may include analyzing the principal component output to detect whether a fault condition exists in the operational state by executing an expert analysis tool on the operational state of the process plant in view of the normal operational state via a comparison of the principal component output and the principal component data.

The analyzing step may include applying a plurality of expert rules for the comparison of the principal component output with the principal component data.

The method may further include generating a graphic display of the connected arrangement of the simulation elements, providing data indicative of the fault condition from the expert analysis tool for the graphic display, and displaying the data by modifying the graphic display of the simulation elements associated with the one or more physical devices implicated by the fault condition.

Generating the graphic display may include providing a user interface for selection of one of the simulation elements and generation of a principal component data display of information related to the selected simulation element. Providing the user interface may include providing a configuration tool for user definition of an expert rule associated with the selected simulation element for subsequent use by the expert analysis tool. Also, providing the user interface may include providing a PCA configuration tool for user definition of the set of simulated operational parameters utilized to define the normal operational state. Providing the PCA configuration tool may include selecting a time period from which to draw data for one or more of the simulated operational parameters.

The principal component output may be derived further from a current value of one of the set of simulated operational parameters such that the monitoring step includes analyzing the current value in combination with the set of process measurements. The current value may be predictive of a future operational condition of the process plant such that the principal component output is indicative of a future operational state.

Above-described examples include an expert module integrated with a process module. One of ordinary skill in the art will recognize that expert modules may be similarly integrated with other modules associated with the process plant, such as control modules.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A configuration system for configuring a process control system of a process plant, the configuration system comprising:
    a configuration database stored in a computer readable memory to store a configuration of the process control system;
    a process module stored in the configuration database, the process module comprising a plurality of process objects, each process object representing a corresponding physical entity in the process plant and providing data associated with the corresponding physical entity, the process module representing a logical unit in the process plant; and
    a set of expert rules stored in the configuration database, the set of expert rules associated with the process module and adapted to be applied by an expert engine to detect at least one abnormal situation associated with the logical unit, the set of expert rules referencing the data provided by the plurality of processes objects of the process module.

2. A configuration system according to claim 1, wherein at least some of the process objects of the process module include simulation capabilities to simulate the corresponding physical entities.

3. A configuration system according to claim 1, further comprising an execution engine communicatively coupled to the configuration database, the execution engine configured to execute the process module and to apply the set of expert rules during operation of the process plant.

4. A configuration system according to claim 3, further comprising a workstation having a processor with the computer readable memory being communicatively coupled to the workstation,
    wherein the computer readable memory has stored therein programming instructions to configure the processor to implement the execution engine.

5. A configuration system according to claim 1, wherein the expert rules are configured to cause at least some alerts of the process module to be disabled if a set of facts are detected by an expert engine.

6. A configuration system according to claim 1, wherein the expert rules are configured to cause at least one alert to be generated if a set of facts are detected by an expert engine.

7. A configuration system according to claim 1, further comprising a process graphic stored in the configuration database, the process graphic comprising a graphical representation depicting the logical unit and adapted to be displayed on a display device during execution of the process module, wherein the process graphic is configured to depict information provided by an expert engine applying the set of expert rules during operation of a process.

8. A configuration system according to claim 1, wherein the configuration database includes a library of expert rule templates.

9. A configuration system according to claim 1, wherein the configuration database is adapted to keep track of versions of the set of expert rules.

10. A configuration system for configuring a process control system of a process plant, the configuration system comprising:
    a configuration database stored in a computer readable memory to store a configuration of the process control system; and
    a process module stored in the configuration database, the process module comprising:
        a plurality of process objects, each process object representing a corresponding physical entity in the process plant, the process module representing a logical unit in the process plant; and
    a set of expert rules associated with the process module and adapted to be applied by an expert engine to detect at least one abnormal situation associated with the logical unit, the set of expert rules referencing information exposed by the process module.

11. A system for monitoring a process control system of a process plant, the system comprising:
    a processor;
    a computer readable memory;
    a process module stored in the computer readable memory, the process module comprising a plurality of interconnected process objects, each process object representing a corresponding physical entity in the process plant, the process module representing a logical unit in the process plant, each process object having a parameter memory storage to store parameter data corresponding to the physical entity represented by the process object, wherein at least some of the process objects of the process module include simulation capabilities to simulate the corresponding physical entities;
    an expert module stored in the computer readable memory, the expert module including a set of expert rules associated with the process module and adapted to be applied by an expert engine to detect at least one abnormal situation associated with the logical unit, the set of expert rules referencing parameter data of the process module, the expert module including expert module parameters associated with evaluation of the expert rules;
    a process graphic stored in the computer readable memory, the process graphic adapted to provide on a user interface a graphical depiction of the logical unit, parameter data of the process module, and parameter data of the expert module;
    an execution engine stored in the computer readable memory and adapted to be executed by the processor, the execution engine to execute the process module during operation of the process plant and to display on the user interface the graphical depiction of the logical unit, the parameter data of the process module, and the parameter data of the expert module; and
    an expert engine stored in the computer readable memory and adapted to be executed by the processor, the expert engine to apply the set of expert rules of the expert module.

12. A system according to claim 11, wherein the execution engine comprises the expert engine.

13. A system according to claim 11, wherein the execution engine is adapted to permit a user, during operation of the process, to select parameters of the expert module for display.

14. A system according to claim 11, wherein the expert engine is adapted to permit a user, during operation of the process, to modify the set of expert rules.

15. A system according to claim 11, wherein the expert rules are configured to cause at least some alerts of the process module to be disabled if a set of facts are detected by the expert engine.

16. A system according to claim 11, wherein the expert rules are configured to cause at least one alert to be generated if a set of facts are detected by the expert engine.

17. A method to facilitate monitoring a process control system of a process plant, the method comprising:
configuring a process module, the process module comprising a plurality of interconnected process objects, each process object representing a corresponding physical entity in the process plant, the process module representing a logical unit in the process plant;
configuring an expert module, the expert module including a set of expert rules associated with the process module and adapted to be applied by an expert engine to detect at least one abnormal situation associated with the logical unit, the set of expert rules referencing parameter data of the process module, the expert module including expert module parameters associated with evaluation of the expert rules;
configuring a process graphic, the process graphic adapted to provide on a user interface a graphical depiction of the logical unit, parameter data of the process module, and parameter data of the expert module;
storing the configured process module, the configured expert module, and the configured process graphic to a configuration database, the configuration database to store a configuration of the process control system; and
downloading the configured process module, the configured expert module, and the configured process graphic to a workstation in the process plant, the workstation adapted to implement an execution engine to execute the process module, to display the process graphic on a user interface, and to implement the expert engine during operation of the process.

18. A method according to claim 17, further comprising generating an alert in an alert system of the process control system using the expert engine during operation of the process.

19. A method according to claim 17, further comprising disabling a group of alarms associated with at least one of the process module or the expert module using the expert engine during operation of the process.

20. A method according to claim 17, further comprising permitting an operator to modify the set of expert rules via the workstation during operation of the process.

* * * * *